United States Patent
Marinier et al.

(10) Patent No.: US 10,143,016 B2
(45) Date of Patent: Nov. 27, 2018

(54) METHODS, APPARATUS AND SYSTEMS FOR PERFORMING MULTI-RADIO ACCESS TECHNOLOGY CARRIER AGGREGATION

(71) Applicant: InterDigital Patent Holdings, Inc., Wilmington, DE (US)

(72) Inventors: Paul Marinier, Brossard (CA); Diana Pani, Montreal (CA); Ghyslain Pelletier, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 58 days.

(21) Appl. No.: 14/936,018

(22) Filed: Nov. 9, 2015

(65) Prior Publication Data

US 2016/0066364 A1  Mar. 3, 2016

Related U.S. Application Data

(63) Continuation of application No. 13/304,008, filed on Nov. 23, 2011, now Pat. No. 9,271,290.
(Continued)

(51) Int. Cl.
*H04W 76/02* (2009.01)
*H04W 72/04* (2009.01)
(Continued)

(52) U.S. Cl.
CPC ..... *H04W 76/025* (2013.01); *H04W 72/0453* (2013.01); *H04W 76/15* (2018.02);
(Continued)

(58) Field of Classification Search
CPC . H04W 36/0066; H04W 36/14; H04W 24/02; H04W 24/08; H04W 24/10
See application file for complete search history.

(56) References Cited

U.S. PATENT DOCUMENTS

| 8,248,996 B2 | 8/2012 | Li et al. |
| 8,369,290 B2 | 2/2013 | Xing et al. |

(Continued)

FOREIGN PATENT DOCUMENTS

| CN | 101867878 | 10/2010 |
| EP | 2242300 | 10/2010 |

(Continued)

OTHER PUBLICATIONS

"Taiwanese Examination Notification", Taiwanese Application No. 105111404, Dec. 20, 2016, 6 pages.
(Continued)

*Primary Examiner* — Chandrahas B Patel
(74) *Attorney, Agent, or Firm* — Eric Berkowitz

(57) ABSTRACT

A method of managing carrier aggregation for a multi-radio access technology (RAT) wireless transmitter/receiver unit (WTRU) is disclosed. The method may include: receiving, by the WRTU over a primary channel associated with a RAT of a first type, provisioning information for provisioning a supplementary channel associated with a RAT of a second type; establishing the supplementary channel associated with the RAT of the second type based on the received provisioning information; and wirelessly exchanging, by the WRTU, first data associated with a communication over the primary channel via the RAT of the first type, while wireless exchanging second data associated with the communication over the supplementary channel via the RAT of the second type.

18 Claims, 13 Drawing Sheets

Related U.S. Application Data

(60) Provisional application No. 61/419,712, filed on Dec. 3, 2010, provisional application No. 61/467,521, filed on Mar. 25, 2011.

(51) Int. Cl.
| | | |
|---|---|---|
| *H04W 88/06* | (2009.01) | |
| *H04W 76/15* | (2018.01) | |
| *H04W 76/28* | (2018.01) | |
| *H04W 48/10* | (2009.01) | |
| *H04W 52/34* | (2009.01) | |
| *H04W 52/38* | (2009.01) | |
| *H04W 76/16* | (2018.01) | |

(52) U.S. Cl.
CPC ........... *H04W 76/28* (2018.02); *H04W 88/06* (2013.01); *H04W 48/10* (2013.01); *H04W 52/34* (2013.01); *H04W 52/38* (2013.01); *H04W 72/042* (2013.01); *H04W 76/16* (2018.02)

(56) References Cited

U.S. PATENT DOCUMENTS

| 9,185,580 | B2* | 11/2015 | Jung ................... H04W 24/10 |
|---|---|---|---|
| 2005/0202823 | A1 | 9/2005 | Shaheen et al. |
| 2007/0116012 | A1 | 5/2007 | Chang et al. |
| 2008/0171561 | A1 | 7/2008 | Irony et al. |
| 2008/0220787 | A1 | 9/2008 | Stanwood et al. |
| 2009/0103496 | A1 | 4/2009 | Purkayastha et al. |
| 2009/0247163 | A1 | 10/2009 | Aoyama et al. |
| 2010/0260147 | A1 | 10/2010 | Xing et al. |
| 2011/0281615 | A1 | 11/2011 | Yamada et al. |
| 2011/0300856 | A1 | 12/2011 | Aminaka |
| 2012/0082107 | A1 | 4/2012 | Ou et al. |

FOREIGN PATENT DOCUMENTS

| EP | 2341679 | 7/2011 |
|---|---|---|
| JP | 2004-007279 | 1/2004 |
| JP | 2008-508832 | 3/2008 |
| JP | 2010-220214 | 9/2010 |
| JP | 2012-528538 | 11/2012 |
| KR | 10-2007-0041096 | 4/2007 |
| TW | 201008315 | 2/2010 |
| WO | WO-2006/019237 | 2/2006 |
| WO | WO-2010/033438 | 3/2010 |
| WO | WO-2010/044632 | 4/2010 |
| WO | WO-2010/073830 | 7/2010 |
| WO | WO-2010/103725 | 9/2010 |
| WO | WO-2010/105148 | 9/2010 |
| WO | WO-2010/138634 | 12/2010 |

OTHER PUBLICATIONS

"Taiwanese Examination Notification (English translation)", Taiwanese Application No. 105111404, Dec. 20, 2016, 5 pages.
"Office Action" issued by Korean Patent Office, Korean Patent Application No. 10-2013-7017409, Mar. 22, 2017, 6 pages.
"Office Action (English Translation)" issued by Korean Patent Office, Korean Patent Application No. 10-2013-7017409, Mar. 22, 2017, 6 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 53 pages.
"3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.5.0, Dec. 2010, 252 pages.
"3rd Generation Partnership Project; Technical Specification Group Radio Access Network; Multiplexing and channel coding (Release 10)", 3GPP TS 36.212 V10.0.0, Dec. 2010, 72 pages.
"3rd Generation Partnership Project; Technical Specification Group Radio Access Network; Physical layer procedures (Release 10)", 3GPP TS 36.213 V10.0.0, Dec. 2010, 98 pages.
"3rd Generation Partnership Project; Technical Specification Group Radio Access Network; Radio Resource Control (RRC); Protocol specification (Release 10)", 3GPP TS 25.331 V10.2.0, Dec. 2010, 1834 pages.
"Chinese Office Action", Chinese Application No. 201180058295.2, Nov. 17, 2015, 8 pages.
"Chinese Office Action (English Translation)", Chinese Application No. 201180058295.2, Nov. 17, 2015, 11 pages.
"International Search Report and Written Opinion", dated Jan. 31, 2012, International Patent Application No. PCT/US2011/062091, 7 pages.
"Japanese Notice of Rejection", Japanese Application No. 2013-542065, dated Oct. 27, 2015, 5 pages.
"Japanese Notice of Rejection (English Translation)", Japanese Application No. 2013-542065, dated Oct. 27, 2015, 5 pages.
"Patent Abstract of JP 2010-220214", dated Sep. 30, 2010, 2 pages.
Ericsson, "Impact of Carrier Aggregation on the L2 protocol architecture", 3GPP Tdoc R2-092957, 3GPP TSG-RAN WG2 #66, San Francisco, USA, May 4-8, 2009, 8 pages.
Ericsson, et al., "Spectrum migration from HSPA to LTE", 3GPP Tdoc R1-111089, 3GPP TSG-RAN WG1 Meeting #64, Taipei, Taiwan, Feb. 21-25, 2011, 4 pages.
Huawei, HiSilicon, "Migration scenarios and possible aggregation between HSPA and LTE", 3GPP Tdoc R1-111126, 3GPP TSG RAN WG1 #64, Taipei, Taiwan, Feb. 21-25, 2011, 4 pages.
LG Electronics, et al., "Wid for Operator Policies for IP Interface Selection (OPIIS)", 3GPP Tdoc S2-110668, 3GPP TSG SA WG2 Meeting #83, Salt Lake City, Utah, USA, Feb. 21-25, 2011, 6 pages.
Nokia, et al., "Stage 2 Description of Carrier Aggregation", 3GPP Tdoc R2-101985, Change Request 36.300 CR NUM V9.2.0, 3GPP TSG-RAN WG2 Meeting #69, Beijing, China, Apr. 12-16, 2010, 16 pages.
Nokia Siemens Networks, et al., "Aggregating HSDPA and LTE carriers", 3GPP Tdoc R1-111060, 3GPP TSG-RAN WG1 Meeting #64, Taipei, Taiwan, Feb. 21-25, 2011, 3 pages.
ZTE, "Consideration on the aggregation of LTE and HSPA", 3GPP Tdoc R1-111173, 3GPP TSG-RAN WG1 Meeting #64, Taipei, Taiwan, Feb. 21-25, 2011, 4 pages.
"Japanese Notice of Allowance", Japanese Application No. 2013-542065, dated Jun. 21, 2016, 3 pages.
"Japanese Notice of Allowance (English Translation)", Japanese Application No. 2013-542065, dated Jun. 21, 2016, 3 pages.
"Japanese Official Notice of Rejection", Japanese Application No. 2016-143413, dated Sep 5, 2017, 5 pages.
"Japanese Official Notice of Rejection (English Translation)", Japanese Application No. 2016-143413, dated Sep 5, 2017, 6 pages.
"Patent Abstract", Japanese Publication No. 2004-007279, Jan 8, 2004, 2 pages.
U.S. Pat. No. 9,271,290, granted Feb. 23, 2016.

* cited by examiner

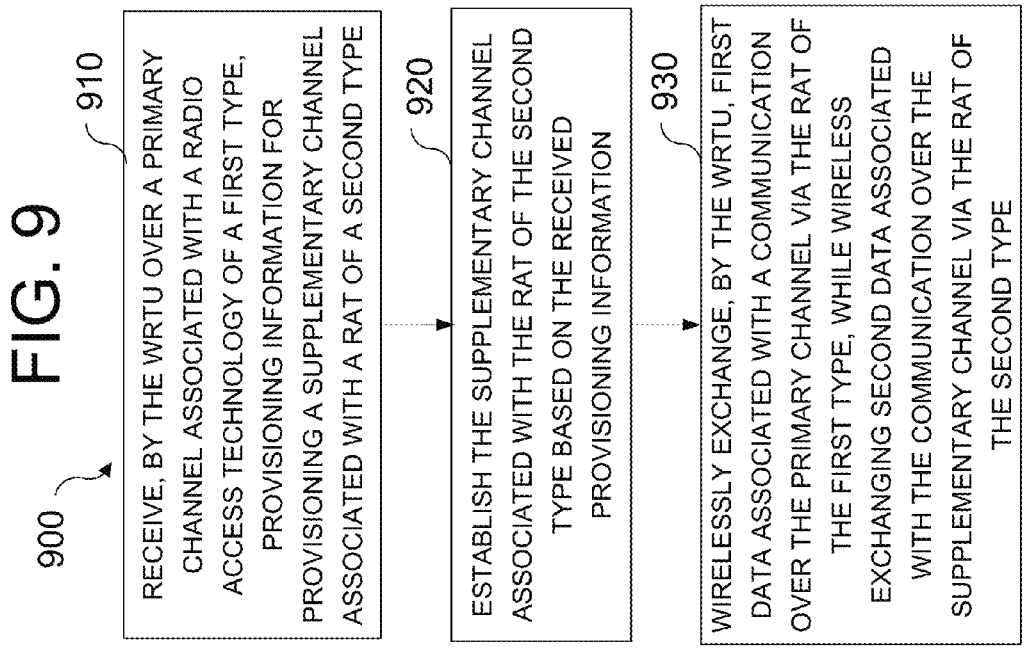

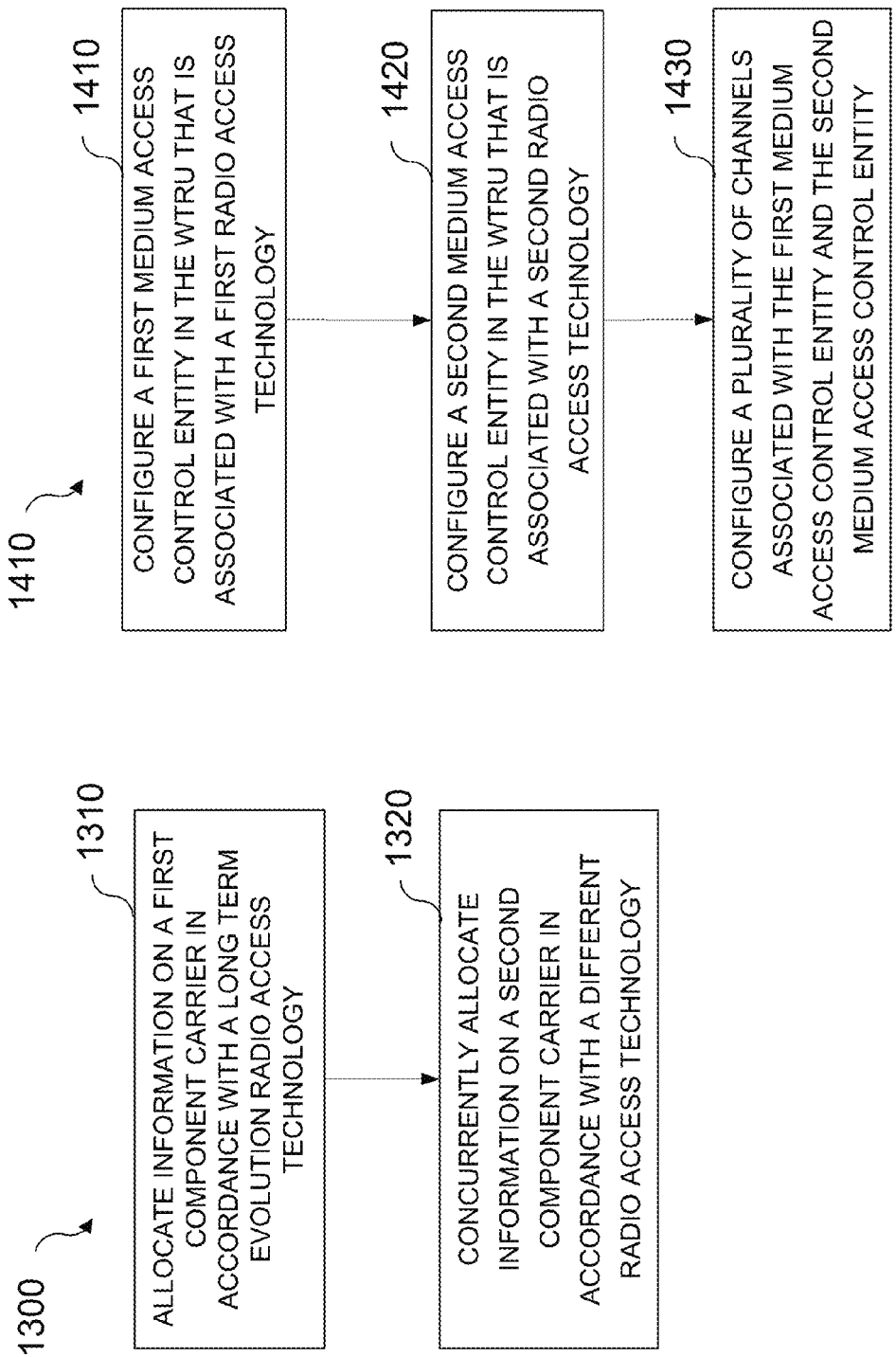

METHODS, APPARATUS AND SYSTEMS FOR PERFORMING MULTI-RADIO ACCESS TECHNOLOGY CARRIER AGGREGATION

CROSS REFERENCE TO RELATED APPLICATIONS

This application is a Continuation of U.S. patent application Ser. No. 13/304,008, filed on Nov. 23, 2011, which claims priority from U.S. Provisional Application No. 61/419,712, filed on Dec. 3, 2010 and U.S. Provisional Application No. 61/467,521, filed on Mar. 25, 2011, the contents of each are incorporated by reference herein.

FIELD OF INVENTION

This application relates to wireless communications and, more particularly, methods, apparatus and systems for performing carrier aggregation using multi-radio access technology.

BACKGROUND

The demand for improved network coverage, improved capacity and increasing bandwidth for both voice and data services in wireless systems has led to continuous development of a number of radio access technologies (RATs) including, but not limited to, global systems for mobile communications (GSM), wideband code division multiple access (WCDMA), high speed packet access (HSPA), including high speed downlink (DL) packet access (HSDPA) and high speed uplink (UL) packet access (HSUPA) with their respective multicarrier counterparts, and long term evolution (LTE), including support for carrier aggregation.

SUMMARY

A method and apparatus are described for performing multi-radio access technology (RAT) carrier aggregation (CA). In one representative method, a first medium access control (MAC) entity may be configured in a wireless transmit/receive unit (WTRU) that is associated with a first RAT, and a second medium access control (MAC) entity may be configured in the WTRU that is associated with a second RAT. A plurality of channels associated with the first MAC entity and the second MAC entity may be configured. The first RAT may be long term evolution (LTE), and the second RAT may be at least one of wideband code division multiple access (WCDMA), high speed packet access (HSPA), high speed downlink packet access (HSDPA) and/or high speed uplink packet access (HSUPA).

Another representative method may manage carrier aggregation for a multi-radio access technology (RAT) wireless transmitter/receiver unit (WTRU). The method may include: (1) receiving, by the WRTU over a primary channel associated with a RAT of a first type, provisioning information for provisioning a supplementary channel associated with a RAT of a second type; (2) establishing the supplementary channel associated with the RAT of the second type based on the received provisioning information; and (3) wirelessly exchanging, by the WRTU, first data associated with a communication over the primary channel via the RAT of the first type, while wireless exchanging second data associated with the communication over the supplementary channel via the RAT of the second type.

In certain representative embodiments, the wirelessly exchanging of the second data over the established supplementary channel may include one of: (1) wirelessly sending the second data over the established supplementary channel; (2) wirelessly receiving the second data over the established supplementary channel or (3) wirelessly sending and receiving different portions of the second data over the established supplementary channel.

In certain representative embodiments, the wirelessly receiving provisioning information may include receiving via the primary channel associated with the RAT of the first type control information for the primary channel and control information for the supplementary channel.

In certain representative embodiments, the first type of RAT may be one of: (1) a wideband code division multiple access (WCDMA) RAT; (2) a high speed packet access (HSPA) RAT; (3) a high speed downlink packet access (HSDPA) RAT; (4) a high speed uplink packet access (HSUPA) RAT; or (5) a long term evolution (LTE) RAT.

In certain representative embodiments, the second type of RAT may be a different one of: (1) the WCDMA RAT; (2) the HSPA RAT; (3) the HSDPA RAT; (4) the HSUPA RAT; (5) a LTE RAT; (6) a non-cellular RAT; or (7) a WiFi RAT.

In certain representative embodiments, the establishing of the supplementary channel associated with the RAT of the second type may include: determining, from the received provisioning information, one or more carrier components associated with the RAT of the second type to be provisioned for wirelessly exchanging the second data over the supplementary channel; and provisioning the supplementary channel using the determined one or more carrier components.

In certain representative embodiments, the method may include prior to receiving by the WRTU the provisioning information, establishing the primary channel associated with the RAT of the first type, and the establishing of the supplementary channel associated with the RAT of the second type may include establishing the supplementary channel using a single radio resource connection to control radio resources of the RATs of the first and second types.

In certain representative embodiments, the establishing of the single radio resource connection may include setting up a radio resource control (RRC) connection.

In certain representative embodiments, the method may include prior to receiving by the WRTU the provisioning information, establishing the primary channel associated with the RAT of the first type and the establishing of the supplementary channel associated with the RAT of the second type may include establishing one or more supplementary channels using at least one respective radio resource connection for each of a plurality of different RAT types to control radio resources associated with the primary and one or more supplementary channels supported concurrently by the WTRU.

In certain representative embodiments, the method may include maintaining the established radio resource connections that are applicable to different sets of one or more carrier components such that the wirelessly exchanging of the first data over the primary channel via the RAT of the first type, while wireless exchanging second data over the supplementary channel via the RAT of the second type may include exchanging respective portions of the first and second data of the communication over different ones of the established radio resource via the different sets of carrier components.

In certain representative embodiments, the exchanging of the first data and the second data may include operating the WTRU at a first frequency or in a first frequency band for exchange of the first data and at a second frequency or in a second frequency band that is the same as or different from the first frequency or the first frequency band.

A further representative method may perform wireless communications using a multi-mode wireless transmit/receive unit (WTRU) that is configured for simultaneous or near-simultaneous operation on component carriers (CCs) associated with a plurality of radio access technologies (RATs). The method may include: (1) configuring, in the WTRU, a high speed packet access (HSPA) medium access control (MAC) entity and a long term evolution (LTE) MAC entity; and (2) configuring a plurality of channels associated with the HSPA and LTE MAC entities.

In certain representative embodiments, the configuring of the HSPA MAC entity and the LTE MAC entity may include integrating the HSPA MAC and the LTE MAC to aggregate data exchanged via HSPA and LTE RATs.

An additional representative method may perform wireless communications using a multi-mode wireless transmit/receive unit (WTRU) that is configured to for concurrent operation on component carriers (CCs) associated with a plurality of radio access technologies (RATs). The method may include: (1) exchanging information on a first CC in accordance with a first RAT; (2) concurrently exchanging information on a second CC in accordance with a second RAT; and (3) aggregating or segmenting the information exchanged via the first and second CCs.

In certain representative embodiments the method may include configuring one of: (1) a single radio resource connection to maintain the exchange of the information on the first and second CCs; (2) a radio resource connection for each CC used to maintain the exchange of the information on the first and second CCs; or (3) a radio resource connection for each RAT used to maintain the exchange of the information on the first and second CCs.

In certain representative embodiments, the method may include sending, by the WRTU, a block acknowledgment associated with the second CC on the first CC to provide a block acknowledgment/non-acknowledgement indication associated information exchanged on the second CC.

A still further representative method may perform wireless communications in a wireless transmit/receive unit (WTRU) supporting multi-radio access technology (RAT) carrier aggregation (CA). The method may include allocating information on a first carrier according to a first RAT; and concurrently allocating information on a second carrier according to a second RAT.

In certain representative embodiments, the second RAT may be a different RAT than the first RAT.

A still additional representative method may perform wireless communications using a multi-mode wireless transmit/receive unit (WTRU) that is configured for concurrent operation on component carriers (CCs) associated with a plurality of radio access technologies (RATs). The method may include allocating information on a first CC in accordance with a long term evolution (LTE) RAT; and concurrently allocating information on a second CC in accordance with a different RAT. For example, a first portion of a communication (e.g., first information) to be sent by the WTRU may be allocated via resource block for a first CC and, at the same time, a second portion of the communication (e.g., second information) to be sent may be allocated via another resource block for a second CC.

In certain representative embodiments, a single radio resource control (RRC) connection may be used to control radio resources of the RATs supported concurrently by the WTRU.

In certain representative embodiments, the method may include concurrently using, by the WTRU, one radio resource control (RRC) connection for each of the plurality of RATs applicable to different sets of at least one CC such that the plurality of RATs may operate on the same or different frequencies.

Another additional representative method may perform wireless communications in a wireless transmit/receive unit (WTRU) supporting multi-radio access technology (RAT) carrier aggregation (CA). The method may include configuring a first medium access control (MAC) entity in the WTRU that is associated with a first RAT; configuring a second medium access control (MAC) entity in the WTRU that is associated with a second RAT; and configuring a plurality of channels associated with the first MAC entity and the second MAC entity.

In certain representative embodiments, the first RAT may be long term evolution (LTE), and the second RAT may be one of: (1) wideband code division multiple access (WCDMA); (2) high speed packet access (HSPA); (3) high speed downlink packet access (HSDPA); (4) high speed uplink packet access (HSUPA); (5) a non-cellular radio access; or (6) a WiFi radio access.

One representative wireless transmit/receive unit (WTRU) may include: a transmit/receive unit configured to receive over a primary channel associated with a RAT of a first type, provisioning information for provisioning a supplementary channel associated with a RAT of a second type; and a processor configured to establish the supplementary channel associated with the RAT of the second type based on the received provisioning information such that the transmit/receive unit wirelessly exchanges first data associated with a communication over the primary channel via the RAT of the first type, while wireless exchanging second data associated with the communication over the supplementary channel via the RAT of the second type.

In certain representative embodiments, the transmit/receive unit wirelessly may receive, via the primary channel associated with the RAT of the first type, control information for the primary channel and control information for the supplementary channel.

In certain representative embodiments, the transmit/receive unit wirelessly may exchange the first data using one of: (1) a wideband code division multiple access (WCDMA); (2) a high speed packet access (HSPA); (3) a high speed downlink packet access (HSDPA); (4) a high speed uplink packet access (HSUPA); and/or (5) long term evolution; (LTE) access;

In certain representative embodiments, the transmit/receive unit may exchange the second data, during the exchange of the first data, using at least a different one of: (1) the WCDMA; (2) the HSPA; (3) the HSDPA; (4) the HSUPA; (5) the LTE access; (6) a non-cellular access; and/or (7) a WiFi access.

In certain representative embodiments, the processor may determine from the received provisioning information one or more carrier components associated with the RAT of the second type to be provisioned for wirelessly exchanging the second data over the supplementary channel; and may provision the supplementary channel using the determined one or more carrier components.

In certain representative embodiments, the processor, prior to receiving the provisioning information, may establish the primary channel associated with a single radio resource connection and, after receiving the provisioning information, may establish the supplementary channel associated with the same single radio resource connection of the primary channel to control radio resources of the RATs of the first and second types.

In certain representative embodiments, the processor, prior to receiving the provisioning information, may establish the primary channel associated with a first radio resource connection and, after receiving the provisioning information, may establish the supplementary channel associated with a second radio resource connection to respectively control radio resources of the RATs of the first and second types.

In certain representative embodiments, the processor may operate the WTRU at a first frequency or in a first frequency band for exchange of the first data and at a second frequency or in a second frequency band that is the same or different from the first frequency or the first frequency band.

Another representative multi-mode wireless transmit/receive unit (WTRU) may perform wireless communications and may be configured for concurrent operation on component carriers (CCs) associated with a plurality of radio access technologies (RATs). The multi-mode WTRU may include: a processor configured for concurrent operation of a high speed packet access (HSPA) medium access control (MAC) entity, a long term evolution (LTE) MAC entity; and a plurality of channels associated with the HSPA and LTE MAC entities such that the HSPA MAC entity and the LTE MAC entity are configured to aggregate data exchanged via HSPA and LTE RATs.

A further multi-mode wireless transmit/receive unit (WTRU) may perform wireless communications and may be configured to support simultaneous or near-simultaneous operation on component carriers (CCs) associated with a plurality of radio access technologies (RATs), The multi-mode WTRU may include: a transmit/receive unit configured to exchange information via a first CC in accordance with a first RAT and to concurrently exchange information via a second CC in accordance with a second RAT; and a processor configured to aggregate or to segment the information exchanged via the first and second CCs.

In certain representative embodiments, the WTRU may be one of: (1) an end user terminal; or a network access point.

In certain representative embodiments, a non-transitory computer readable storage medium may store program code executable by computer for implementing any representative method.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 9 is a flowchart illustrating a representative method for managing carrier aggregation for a multi-RAT WTRU;

FIG. 10 is a flowchart illustrating a representative method for performing wireless communications using a multi-mode WTRU;

FIG. 13 is a flowchart illustrating a further representative method for performing wireless communications using a multi-mode WTRU; and FIG. 14 is a flowchart illustrating another representative method for performing wireless communications in a WTRU 102 supporting multi-RAT CA.

DETAILED DESCRIPTION

Spectrum is a costly resource and not all frequency bands may be available to all operators. Operators may offer support for both HSPA and LTE services with carrier aggregation scenarios that may typically use a few component carriers (CCs) per RAT (e.g., may be limited to, for example, at most 2-3 CCs per RAT for a particular operator). Legacy deployments may be maintained for the foreseeable future (e.g., during and/or after LTE deployment), which may lead to underutilization of radio resources, spectrum and capacity in one or more of the operator's RATs.

Operators may also offer support for WiFi services e.g. in hot spot areas, using for example one or more WiFi technology such as 802.11b/g/n in the 2.4 GHz frequency band, 802.11y in the 3.6 GHz frequency band and/or 802.11a/h/j/n in the 5 GHz frequency band.

In certain representative embodiments, methods, apparatus and systems may allow a wireless transmit/receive unit (WTRU) to operate simultaneously on multiple frequencies such that the WTRU may operate on at least one of the frequencies according to a different RAT (e.g., the WTRU may operate using multiple RATs).

WTRU generally refers to, but is not limited to, user equipment (UE), a mobile station, a fixed or mobile subscriber unit, a pager, a cellular telephone, a personal digital assistant (PDA), a tablet, a computer, or any other type of user device capable of operating in a wireless environment. Base station generally refers to, but is not limited to, a Node-B, a site controller, an access point (AP), or any other type of interfacing device capable of operating in a wireless environment.

Figure 1A:
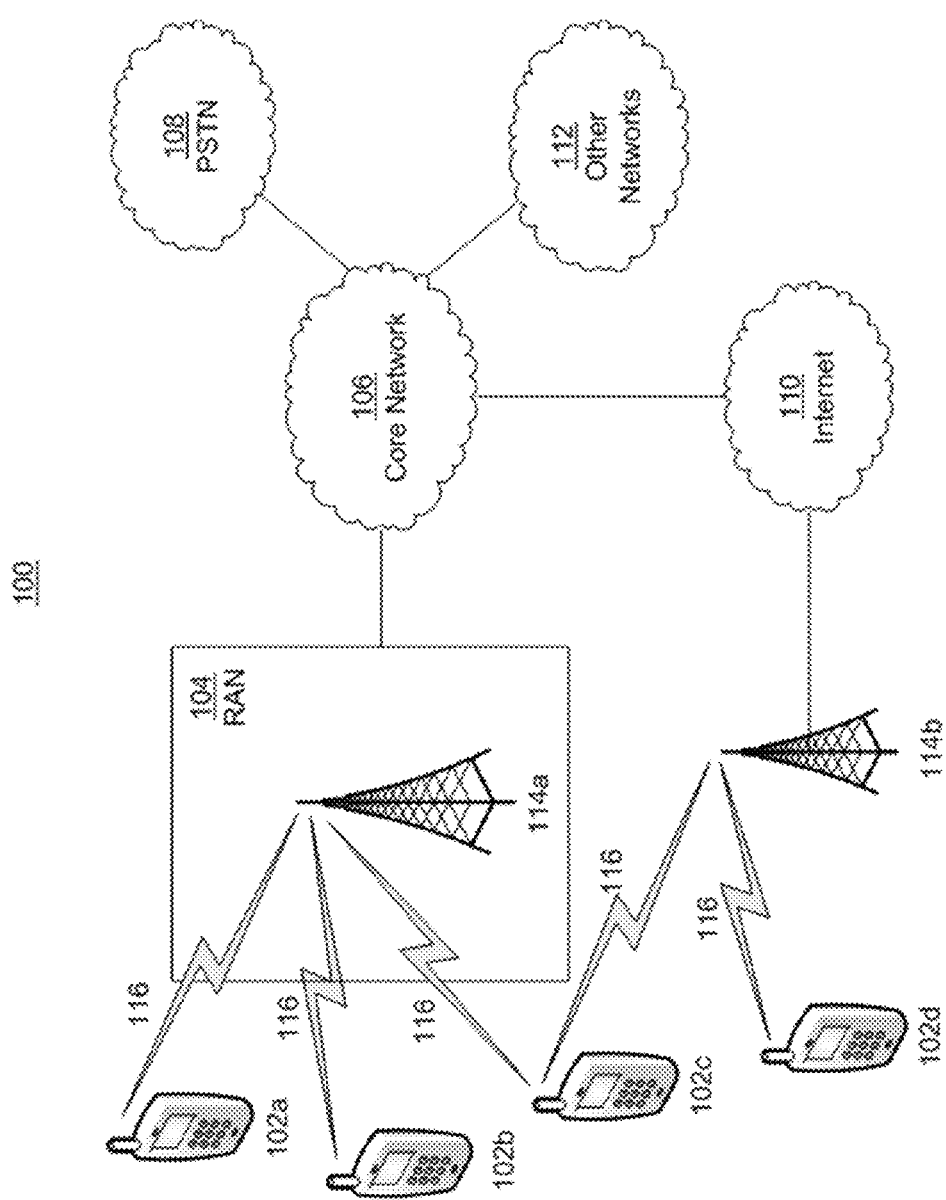
FIG. 1A is a diagram illustrating a representative communication system in which one or more disclosed embodiments may be implemented.

FIG. 1A is a diagram illustrating a representative communication system in which one or more disclosed embodiments may be implemented.

The communication system 100 may be a multiple access system that provides content, such as voice, data, video, messaging, and/or broadcast, among others, to multiple wireless users. The communication system 100 may enable multiple wireless users to access such content through the sharing of system resources, including wireless bandwidth. For example, the communication system 100 may employ one or more channel access methods, such as code division multiple access (CDMA), time division multiple access (TDMA), frequency division multiple access (FDMA), orthogonal FDMA (OFDMA), and/or single-carrier FDMA (SC-FDMA), among others.

As shown in FIG. 1A, the communication system 100 may include WTRUs 102a, 102b, 102c, 102d, a radio access network (RAN) 104, a core network 106, a public switched telephone network (PSTN) 108, the Internet 110, and other networks 112, although it is contemplated that the disclosed embodiments may use any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a tablet, a wireless sensor, and/or consumer electronics, among others.

The communication systems 100 may also include a base station 114a and a base station 114b. Each of the base stations 114a and 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a and 114b may be a base transceiver station (BTS), a Node-B, an evolved Node-B (eNB), a Home Node-B (HNB), a Home eNB (HeNB), a site controller, an access point (AP), and/or a wireless router, among others. Although the base stations 114a, 114b are each depicted as a single element, it is contemplated that the base stations 114a and 114b may include any number of interconnected base stations and/or network elements.

The base station 114a may be part of the RAN 104, which may include other base stations and/or network elements (not shown), such as one or more base station controllers (BSCs), one or more radio network controllers (RNC), and/or one or more relay nodes, among others. The base station 114a and/or the base station 114b may be configured to transmit and/or receive wireless signals within a particular geographic region, (e.g., which may be referred to as a cell (not shown)). The cell may further be divided into cell sectors. For example, the cell associated with the base station 114a may be divided into three sectors. In certain representative embodiments, the base station 114a and/or 114b may include three transceivers, (e.g., one transceiver for each sector of the cell). In certain representative embodiments, the base station 114a may employ multiple-input multiple-output (MIMO) technology and may utilize multiple transceivers for each sector of the cell.

The base stations 114a and 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), and/or visible light, among others). The air interface 116 may be established using any suitable radio access technology (RAT).

The communication system 100 may be a multiple access system and may employ one or more channel access schemes, such as CDMA, TDMA, FDMA, OFDMA, and/or SC-FDMA, among others. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed DL packet access (HSDPA) and/or high-speed UL packet access (HSUPA), among others.

In certain representative embodiments, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In certain representative embodiments, the base station 114a and the WTRUs 102a, 102b, 102c may implement radio technologies such as IEEE 802.16 (e.g., worldwide interoperability for microwave access (WiMAX)), CDMA2000, CDMA2000 1×, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), and/or GSM/EDGE RAN (GERAN), among others.

The base station 114b may be a wireless router, HNB, HeNB, and/or AP, for example, and may utilize any suitable RAT for facilitating wireless connectivity in a localized area, such as a place of business, a home, a vehicle, and/or a campus, among others. In certain representative embodiments, the base station 114b and the WTRUs 102c, 102d may implement a radio technology such as IEEE 802.11 to establish a wireless local area network (WLAN). In certain representative embodiments, the base station 114b and the WTRUs 102c, 102d may implement a radio technology such as IEEE 802.15 to establish a wireless personal area network (WPAN). In certain representative embodiments, the base station 114b and the WTRUs 102c, 102d may utilize a cellular-based RAT (e.g., WCDMA, CDMA2000, GSM, LTE, and/or LTE-A, among others), to establish a picocell or femtocell. As shown in FIG. 1A, the base station 114b may have a direct connection to the Internet 110. Thus, the base station 114b may or may not access the Internet 110 via the core network 106.

The RAN 104 may be in communication with the core network 106, which may be any type of network configured to provide voice, data, applications, and/or voice, over Internet protocol (VoIP) services, among others, to one or more of the WTRUs 102a, 102b, 102c, 102d. For example, the core network 106 may provide call control, billing services, mobile location-based services, pre-paid calling, Internet connectivity, and/or video distribution, among others, and/or may perform high-level security functions, such as user authentication. Although not shown in FIG. 1A, it is contemplated that the RAN 104 and/or the core network 106 may be in direct or indirect communication with other RANs that may employ the same RAT or a different RAT as those of the RAN 104. For example, in addition to being connected to the RAN 104, which may be utilizing an E-UTRA radio technology, the core network 106 may be in communication with another RAN (not shown) employing a GSM radio technology.

The core network 106 may serve as a gateway for the WTRUs 102a, 102b, 102c, 102d to access the PSTN 108, the Internet 110, and/or other networks 112, among others. The PSTN 108 may include circuit-switched telephone networks that may provide plain old telephone service (POTS). The Internet 110 may include a global system of interconnected computer networks and devices that use common communication protocols, such as the transmission control protocol (TCP), user datagram protocol (UDP) and/or the Internet protocol (IP) in the TCP/IP suite, among others. The other networks 112 may include wired or wireless communications networks owned and/or operated by one or more service providers. For example, the other networks 112 may include another core network connected to one or more RANs, which may employ the same RAT or a different RAT as those of the RAN 104.

Some or all of the WTRUs 102a, 102b, 102c, 102d in the communication system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology (e.g., a WiFi radio technology).

Figure 1B:
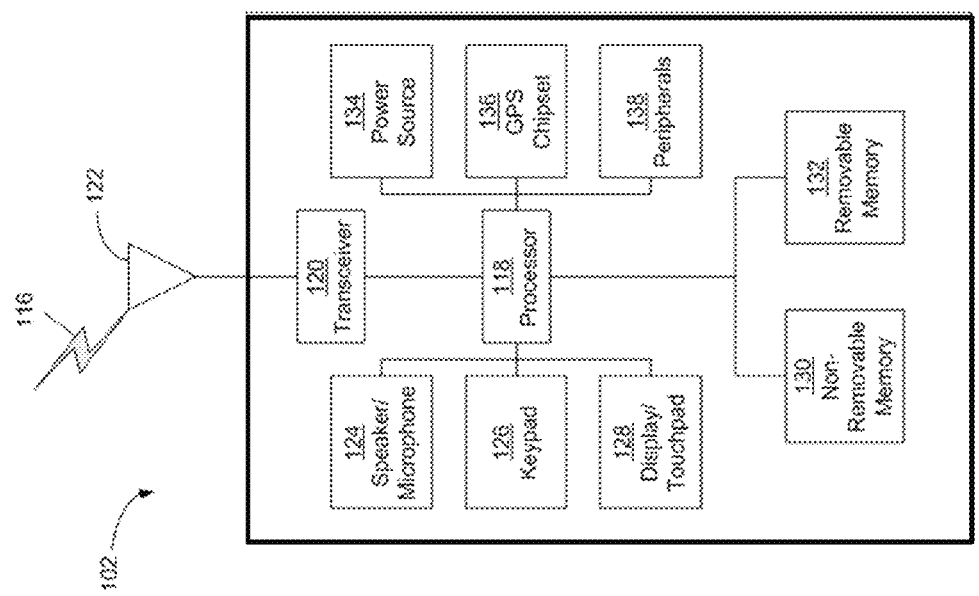
FIG. 1B is a diagram illustrating a representative wireless transmit/receive unit (WTRU) that may be used within the communication system of FIG. 1A.

FIG. 1B is a diagram illustrating a representative wireless transmit/receive unit (WTRU) that may be used within the communication system of FIG. 1A.

Referring to FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and/or peripherals 138, among others. It is contemplated that the WTRU 102 may include any sub-combination of the foregoing elements while remaining consistent with various disclosed embodiments.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), and/or a state machine, among others. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. Although FIG. 1B depicts the processor 118 and the transceiver 120, as separate components, the processor 118 and the transceiver 120 may be integrated together in an electronic package or chip.

The transmit/receive element 122 may be configured to transmit signals to, or receive signals from, a base station (e.g., the base station 114a) over an air interface 116. For example, in certain representative embodiments, the transmit/receive element 122 may be an antenna configured to transmit and/or receive RF signals. In certain representative embodiments, the transmit/receive element 122 may be an emitter/detector configured to transmit and/or receive IR, UV, or visible light signals, for example. In certain representative embodiments, the transmit/receive element 122 may be configured to transmit and receive both RF and light signals. The transmit/receive element 122 may be configured to transmit and/or receive any combination of wireless signals.

Although the transmit/receive element 122 is depicted, as a single element, the WTRU 102 may include any number of transmit/receive elements 122. The WTRU 102 may employ, for example, MIMO technology. In certain representative embodiments, the WTRU 102 may include two or more transmit/receive elements 122, (e.g., multiple antennas) for transmitting and/or receiving wireless signals over the air interface 116.

The transceiver 120 may be configured to modulate the signals that are to be transmitted by the transmit/receive element 122 and/or to demodulate the signals that are received by the transmit/receive element 122. The WTRU 102 may have multi-mode capabilities such that the transceiver 120 may include multiple transceivers for enabling the WTRU 102 to communicate via multiple RATs, such as UTRA and IEEE 802.11 (e.g., a WiFi radio technology), for example.

The processor 118 of the WTRU 102 may be coupled to, and may receive user input data from, the speaker/microphone 124, the keypad 126, and/or the display/touchpad 128 (e.g., a liquid crystal display (LCD) display unit and/or organic light-emitting diode (OLED) display unit), among others. The processor 118 may also output user data to the speaker/microphone 124, the keypad 126, and/or the display/touchpad 128, among others. The processor 118 may access information from, and may store data in, any type of suitable memory, such as the non-removable memory 130 and/or the removable memory 132. The non-removable memory 130 may include random-access memory (RAM), read-only memory (ROM), a hard disk, and/or any other type of memory storage device, among others. The removable memory 132 may include a subscriber identity module (SIM) card, a memory stick, and/or a secure digital (SD) memory card, among others. In certain representative embodiments, the memory may be non-transitory memory.

In certain representative embodiments, the processor 118 may access information from, and store data in, memory that is not physically located on the WTRU 102, such as on a server or a home computer (not shown).

The processor 118 may receive power from the power source 134, and may be configured to distribute and/or to control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), and/or lithium-ion (Li-ion), among others), solar cells, and/or fuel cells, among others.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, and/or 114b) and/or may determine its location based on the timing of the signals being received from two or more nearby base stations. The WTRU 102 may acquire location information by way of any suitable location-determination method while remaining consistent with various disclosed embodiments.

The processor 118 may be coupled to other peripherals 138, which may include one or more software and/or hardware modules that may provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, and/or an Internet browser, among others.

Figure 1C:
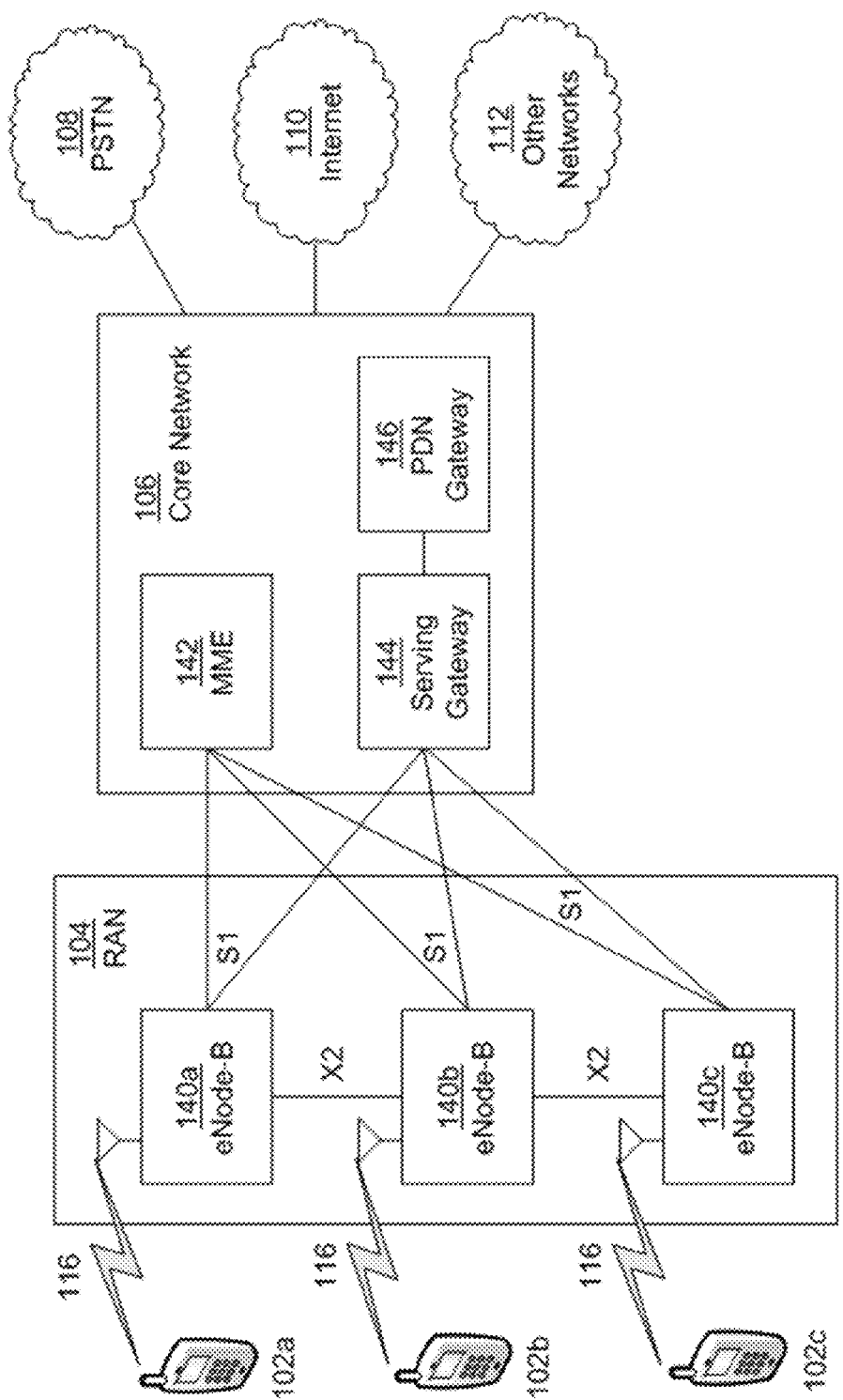
FIG. 1C is a diagram illustrating a representative radio access network and a representative core network that may be used within the communication system of FIG. 1A.

FIG. 1C is a diagram illustrating a representative radio access network and a representative core network that may be used within the communication system of FIG. 1A. The RAN 104 may employ an E-UTRA radio technology to communicate with the WTRUs 102a, 102b, 102c over the air interface 116. The RAN 104 may also be in communication with the core network 106. The RAN 104 may include eNBs 140a, 140b, 140c, although the RAN 104 may include any number of eNBs while remaining consistent with various embodiments. The eNBs 140a, 140b, 140c may each include one or more transceivers for communicating with the WTRUs 102a, 102b, 102c over the air interface 116. In certain representative embodiments, the eNBs 140a, 140b, 140c may implement MIMO technology. The eNB 140a, for example, may use multiple antennas to transmit wireless signals to, and/or receive wireless signals from, the WTRU 102a.

Each of the eNBs 140a, 140b, 140c may be associated with a particular cell (not shown) and may be configured to handle radio resource management decisions, handover decisions, and/or scheduling of users in the UL and/or DL, among others. As shown in FIG. 1C, the eNBs 140a, 140b, 140c may communicate with one another over an X2 interface.

The core network 106 shown in FIG. 1C may include a mobility management entity (MME) 142, a serving gateway 144, and/or a packet data network (PDN) gateway 146, among others. Although each of the foregoing elements are depicted as part of the core network 106, it is contemplated that any of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, and/or selecting a particular serving gateway during an initial attach of the WTRUs 102a, 102b, 102c, among others. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may perform other functions, such as anchoring user planes during inter-eNB handovers, triggering paging when DL data is available for the WTRUs 102a, 102b, 102c, and/or managing and/or storing contexts of the WTRUs 102a, 102b, 102c, among others.

The serving gateway 144 may be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that may serve as an interface between the core network 106 and the PSTN 108. The core network 106 may provide the WTRUs 102a, 102b, 102c with access to other networks 112, which may include other wired or wireless networks that are owned and/or operated by other service providers.

Multi-RAT Carrier Aggregation

By example: (1) HSDPA may simultaneously use DL CCs (e.g., up to 4 DL CCs may be available, and may be increased to up to 8 DL CCs) in conjunction with WCDMA to improve bandwidth usage with frequency diversity and resource pooling; (2) WCDMA may use multiple-input multiple-output (MIMO) in multicarrier DL; and (3) HSUPA may simultaneously use UL CCs. The transmission time interval (TTI) for HSPA may be a 2 ms subframe.

For universal terrestrial radio access network (UTRAN), the radio resource control (RRC), packet data convergence protocol (PDCP), radio link control (RLC), MAC-d and MAC-is sub-layers may be located in an RNC, while MAC-hs, MAC-i and layer 1 (L1) may be located in a Node-B. Security, (e.g., ciphering), segmentation and reassembly services to the MAC, in-order delivery services to the PDCP may be provided by the RLC, and the MAC may ensure ordering between the hybrid automatic repeat request (HARM) processes for the RLC layer.

For LTE, each radio frame (e.g., 10 ms) may include 10 equally sized sub-frames of 1 ms, (e.g., the TTI for LTE may use a 1ms subframe). By example, LTE may provide simulaneous transmission and/or reception using radio resources of a plurality of CCs between an evolved Node-B (eNB) and a WTRU within the same transmission interval. For evolved UTRAN (eUTRAN), there is no radio network controller (RNC), and RRC/PDCP/RLC/MAC layers may be provided (e.g., all located) in the eNB. Security, (e.g., ciphering and integrity protection) and in-order delivery services (e.g., at handover) may be provided by a PDCP. The RLC may provide segmentation, resegmentation and/or reassembly services to the MAC.

Figure 2:
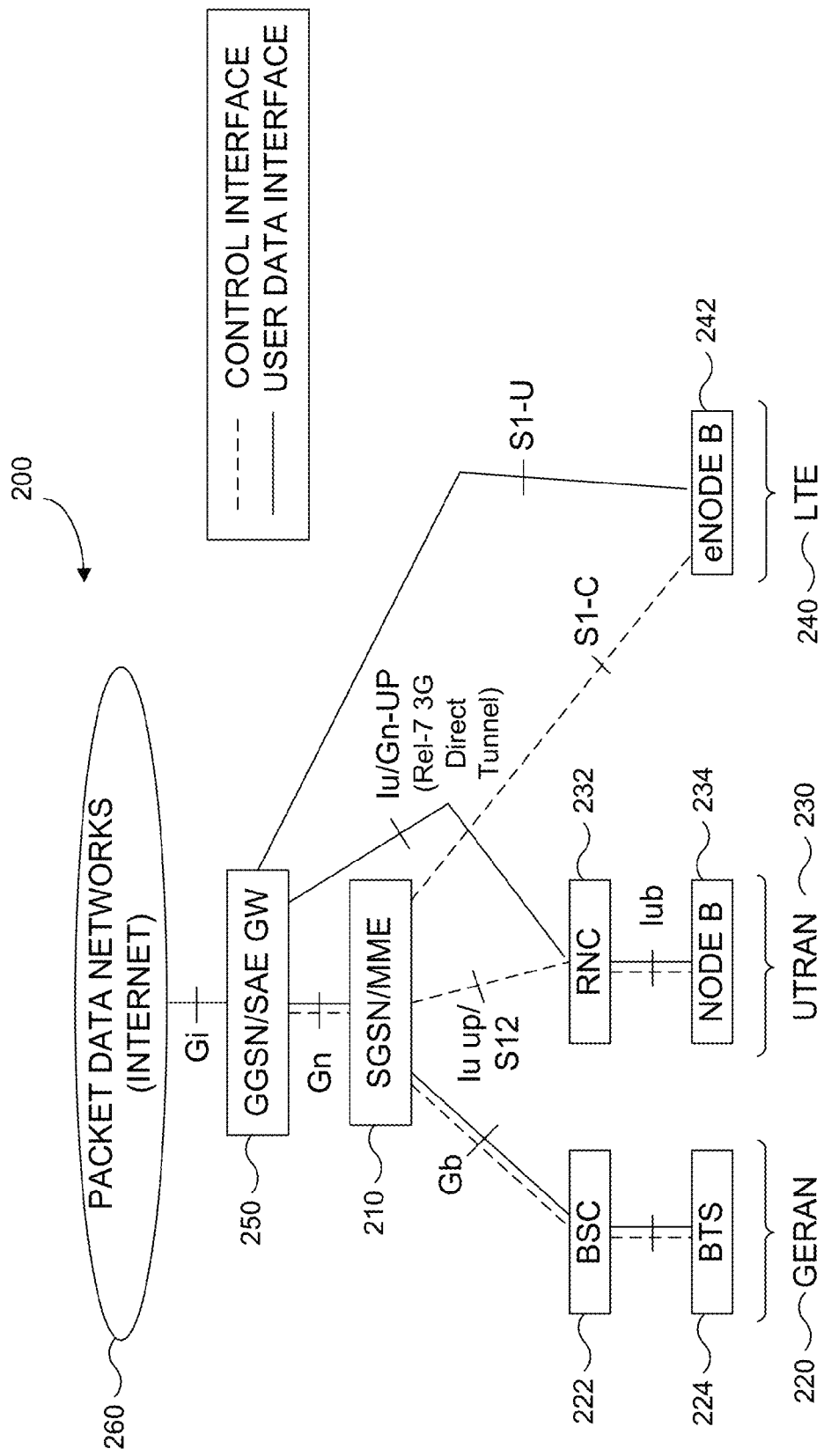
FIG. 2 is a diagram illustrating a representative packet data network architecture supporting numerous radio access technologies (RATs)

FIG. 2 is a diagram illustrating a representative communication system 200 that may be used in the communication system of FIGS. 1A and/or 1C.

Referring to FIG. 2, the communication system 200 may include a SGSN/MME platform 210 to support evolved packet core (EPC) and/or General Packet Radio Service (GPRS) core. The SGSN/MME platform 210 may interface via a Gb interface (e.g., for control signaling and user data) to a Global System for Mobile Communications (GSM)/Edge Radio Access Network (GERAN) 220. The GERAN 220 may include, for example a Base Station Controller (BSC) 222 and Base Transceiver Station (BTS) 224.

The SGSN/MME platform 210 may interface (e.g., for control signaling) via a Iu up/S12 interface to a UTRAN 230. The UTRAN 320 may include a RNC 232 and a node B 234. A Gateway GPRS Serving Support/System Architecture Evolution (GGSN/SAE) gateway 250 may interface with the RNC 232 via a Iu/Gn-UP interface (e.g., for user data). The GGSN/SAE gateway 250 may interface to a packet data network 260, such as the Internet, via a Gi interface (e.g., for user data) and may interface with the SGSN/MME platform 210 (e.g., for control signaling and user data). The SGN/MME platform 210 may interface via a S1-C interface (e.g., for control signaling) to the LTE network 240. The LTE network 240 may include an eNB 242. The GGSN/SAE gateway 250 may interface via an S1-U interface (e.g., for user data) to the eNB 242.

The packet data network architecture of FIG. 2 may support numerous RATs including, for example, the GERAN RAT 220, the UTRAN RAT 230 and/or the eUTRAN/LTE RAT 240. Operators may deploy LTE using the same sites as the sites used for WCDMA (e.g., legacy WCDMA) deployments, for example, to reduce planning and deployment costs and the reuse deployment sites. Operators may or may not deploy both WCDMA/HSPA and LTE in the same coverage areas as a data enhancement overlay. Multi-mode WTRUs 102, (e.g., which may support WCDMA/HSPA access and/or LTE access and/or WiFi access), may be widely deployed.

HSPA with MIMO may offer DL peak data rates of, for example, 42 Mbps, and multicarrier HSPA may increase the peak rate by providing up to four DL CCs. LTE may include up to 100 Mbps in the single carrier DL and LTE, for example, with intra-RAT carrier aggregation may increase the peak rate by combining transmission resources of up to 5 CCs for example, to reduce the cost of offering higher data rates to maximize usage of deployed RATs, (e.g., through load balancing), or to maximize usage of radio components in the WTRU 102, (e.g., using a dual-band receiver).

Operators may use inter-RAT carrier aggregation to enable reservation of frequency band, (e.g., for HeNB deployment) and combining HSPA resources with LTE resources may ensure service continuity, (e.g., either for circuit switched (CS) voice and/or for services using LTE data rates).

Component Carrier (CC) generally refers to a frequency on which a WTRU 102 operates. For example, the WTRU 102 may receive transmissions on a DL CC. The DL CC may include a plurality of DL physical channels. As another example, the WTRU 102 may perform transmissions on an UL CC. The UL CC may include a plurality of UL physical channels.

For LTE, the DL physical channels may include, for example, a physical control format indicator channel (PC-FICH), a physical HARQ indicator channel (PHICH), a physical data control channel (PDCCH), a physical multi-cast channel (PMCH) and/or a physical data shared channel (PDSCH), among others. On the PCFICH, the WTRU 102 may receive control data indicating size of the control region of the DL CC. On the PHICH, the WTRU 102 may receive control data indicating HARQ positive acknowledgement (ACK)/negative acknowledgement (NACK) feedback for a previous UL transmission. On the PDCCH, the WTRU 102 may receive DL control information (DCI) messages used to schedule DL and UL resources. On the PDSCH, the WTRU 102 may receive user and/or control data.

For LTE, the UL physical channels may include, for example, a physical UL control channel (PUCCH) and/or a physical UL shared channel (PUSCH), among others. On the PUSCH, the WTRU 102 may transmit user and/or control data. On the PUCCH, and/or the PUSCH, the WTRU 102 may transmit UL control information (such as a channel quality indicator (CQI)/precoding matrix indicator (PMI)/rank indicator (RI) and/or scheduling request (SR)) and/or hybrid automatic repeat request (HARQ) ACK/NACK feedback. On a UL CC, the WTRU 102 may be allocated dedicated resources for transmission of a sounding reference signal (SRS).

For example, for HSDPA, a shared channel (e.g., a high speed DL shared channel (HS-DSCH)) may be used for DL transmission. The HS-DSCH may be a transport channel on which the WTRU 102 may receive user data and/or control signaling from logical channels, such as a dedicated transport channel (DTCH), a dedicated control channel (DCCH), a common control channel (CCCH), and/or a broadcast control channel (BCCH), among others. The WTRU 102 may receive the HS-DSCH on the high speed DL shared channel (HS-PDSCH). The WTRU 102 may receive DL control signaling for scheduling of the HS-PDSCH, (e.g., a transport format including channelization code, modulation scheme and transport block size), and/or other types of control signaling (e.g., discontinuous reception (DRX)/discontinuous transmission (DTX) activation/deactivation and/or activation/deactivation commands for additional HSPA cells on the high-speed shared control channel (HS-SCCH). The WTRU 102 may transmit UL feedback control information related to HS-PDSCH transmissions and/or related to HS-SCCH orders. The UL feedback may include HARQ feedback, CQI and/or precoding control information (PCI) (e.g., if the WTRU 102 is configured for MIMO operation) and may be sent on the high-speed dedicated physical control channel (HS-DPCCH) with one for each configured HS-DSCH. Power control commands may be received by the WTRU 102 on the DPCH or on the fractional DPCH (hereafter F-DPCH). There may not be a soft-handover for HS-SCCH and/or HS-DPSCH.

For HSUPA, fast scheduling and fast HARQ for soft combining may use the enhanced dedicated channel (E-DCH). Soft handover may be used for HSUPA. The E-DCH may be mapped on the dedicated physical data channel (E-DPDCH). Each radio link may include zero, one or more E-DPDCHs. The WTRU 102 may transmit control information associated with the E-DCH on the E-DCH dedicated physical control channel (E-DPCCH). Each radio link may include one E-DPCCH. The dedicated physical DL channels used for UL transmissions may include the F-DPCH, the E-DCH relative grant channel (E-RGCH), the E-DCH absolute grant channel (E-AGCH) and/or the E-DCH hybrid ARQ indicator channel (E-HICH), among others. The WTRU 102 may receive power control commands on the DPCH and/or on the F-DPCH. The WTRU 102 may receive UL relative grants from the serving and non-serving radio links, over the associated E-RGCH configured by higher layer signaling for each serving and non-serving radio link. The WTRU 102 may receive absolute grants for E-DCH from the serving E-DCH cell on the E-AGCH configured by higher layer signaling. The WTRU 102 may receive HARQ ACK/NACK (A/N) feedback on the E-DCH HARQ Indication Channel (E-HICH).

A cell may include a DL CC which may be linked to a UL CC based on the system information (SI) received by the WTRU 102 either broadcasted on the DL CC and/or using dedicated configuration signaling from the network. For example, when broadcasted on the DL CC, the WTRU 102 may receive the UL frequency and bandwidth of the linked UL CC as part of the SI element (IE) (e.g., when in RRC IDLE for LTE, or when in idle/CELL forward access channel (FACH) for WCDMA, e.g., when the WTRU 102 does not yet have a radio resource connection to the network). For a WiFi access, a cell may correspond to one or more channel(s) where a channel may correspond to a specific frequency in a frequency band of the concerned WiFi technology.

Primary Cell (PCell) generally refers to a cell operating on a primary or anchor frequency in which the WTRU 102 may perform the initial access to the system 200, (e.g., in which: (1) the WTRU 102 may perform the initial connection establishment procedure; (2) the WTRU 102 may initiate the connection re-establishment procedure; and/or (3) the cell had been indicated as the primary cell in the handover procedure, among others). The PCell may correspond to a frequency indicated as part of the radio resource connection configuration procedure. Certain functions may be supported (e.g., only supported) on the PCell. For example, the UL CC of the PCell may correspond to the CC whose physical UL control channel resources are configured to carry HARQ feedback (e.g., all HARQ ACK/NACK feedback) for the WTRU 102 (e.g., a particular WTRU).

For example, in LTE, the WTRU 102 may use the PCell to derive the parameters for the security functions and for upper layer SI such as non-access stratum (NAS) mobility information. Other functions that may be supported only on the PCell DL include SI acquisition and change monitoring procedures on the broadcast channel (BCCH), and paging. In WCDMA, the Primary Serving Cell may be similar to the PCell of LTE.

Secondary Cell (SCell) generally refers to the cell operating on a secondary or supplemental frequency which may be configured after (e.g., when) a radio resource control connection is established and which may provide additional radio resources. SI (e.g., relevant for operation in the concerned SCell) may be provided using dedicated signaling when the SCell is added to the configuration of the WTRU 102.

Although the parameters for the security functions and for the upper layer SI may have different values than those broadcasted on the DL of the concerned SCell using the SI signaling, the information is referred to as SI of the concerned SCell independent of the method used by the WTRU 102 to acquire this information.

PCell DL and PCell UL generally correspond to the DL CC and the UL CC of the PCell, respectively, and SCell DL and SCell UL generally corresponds to the DL CC and the UL CC (if configured) of the SCell, respectively.

Serving cell generally refers to a primary cell (e.g., a PCell) or a secondary cell (e.g., a SCell). For example, for a WTRU 102 that is not configured with any SCell or that does not enable operation on multiple CCs, (e.g., via carrier aggregation), one serving cell (e.g., only one serving cell) may be included (e.g., the PCell). For a WTRU 102 that is configured with at least one SCell, the serving cell may include a set of one or more cells corresponding to the PCell and the configured SCells (e.g., all of the configured SCells).

When the WTRU 102 is configured with at least one SCell, one PCell DL and one PCell UL may be configured and, for each configured SCell, there may be one SCell DL and one SCell UL (e.g., if configured).

Multi-mode WTRU 102 generally refers to any mobile terminal enabling a plurality of RATs such as any combination of GSM, WCDMA, HSPA, HSDPA, HSUPA and LTE, IEEE 802.11b/g/n, IEEE 802.11y, IEEE 802.16a/h/j/n and IEEE 802.20, cdma2000 1× and/or cdma2000 EV-DO, among others.

Primary RAT (PRAT) and anchor RAT (ARAT) generally refer to a radio access technology (e.g., network technology) for which at least one serving cell is configured as the PCell from which at least one of the following functions, procedures and/or operations may be enabled: (1) an RRC connection (e.g., established and connected using the PCell, for example, via a single RRC contention); and/or (2) security parameters (e.g., derived using the PCell via a security context, for example, a single context). In certain representative embodiments, UL resources may be used to transmit UCI on the serving cell (e.g., only on the serving cell) of a first RAT; and/or at least one serving cell of a first RAT may be used to transmit configured UL resources (e.g., a portion or all of the configured UL resources). In certain representative embodiments, the PRAT and/or the ARAT may be referred to as a serving cell RAT.

Secondary or supplemental RAT (SRAT) and/or non-anchor RAT (NARAT) generally refers to a RAT for which none of the configured serving cells is the PRAT of the WTRU's configuration.

Multi-RAT operation generally refers to any multi-mode WTRU 102 simultaneously configured for operation with at least one CC of a first RAT, (e.g., a DL CC or a UL CC of one or more cells), and with at least one CC of a second RAT (e.g., of the same or a different type), (e.g., a DL CC or a UL CC of one or more other cells). The operation on the different CC may occur simultaneously, or near-simultaneously in time. The operation according to different RATs may be sequential, including on the same CC.

In certain representative embodiments, the multi-mode WTRU 102 may be enabled to provide simultaneous or near-simultaneous operation on CCs of a plurality of RATs. The multi-mode WTRU 102 may be configured to operate on one or more serving cells where at least one serving cell correspond to a first RAT and at least a second serving cell corresponds to a second RAT. The multi-mode WTRU 102 may perform DL and/or UL transmissions using different RATs, and may operate on different frequencies.

In certain representative embodiments, CC aggregation may be applied across multiple RATs. For example, representative procedures may be based on the CC aggregation by a WTRU 102 of at least one CC on radio frequencies used for an LTE deployment together with at least one CC on radio frequencies used for a HSPA deployment. The procedures may provide an RRC connection (e.g., a single RRC connection) that may be used to control radio resources of a plurality of RATs supported concurrently by the WTRU 102. For example, representative procedures may be based on the CC aggregation by a WTRU 102 of at least one CC on radio frequencies used for an HSPA deployment together with at least one CC on radio frequencies used for a LTE deployment. The representative procedures may provide an RRC connection (e.g., a single RRC connection) that may be used to control radio resources of a plurality of RATs supported concurrently by the WTRU 102. For example, representative procedures may be based on the CC aggregation by a WTRU 102 of at least one CC on radio frequencies used for a 3GPP deployment (e.g., LTE and/or HSPA) together with at least one channel within at least one radio frequency band used for a WiFi network. The procedures may provide an RRC connection (e.g., a single RRC connection) of a 3GPP technology that may be used to configure and/or control radio resources of both a 3GPP RAT and a WiFi RAT supported concurrently by the WTRU 102. Such a representative CC aggregation procedure may be referred to as multi-RAT CA.

In certain representative embodiments, another representative procedure may include the WTRU 102 concurrently using one RRC connection for each respective RAT of the plurality of RATs that are applicable to or associated with different sets of at least one CC. The different sets of at least one CC may operate on different frequencies (e.g., respective frequencies). For example, the representative procedures may be based on the WTRU 102 using radio resources on at least one frequency where LTE is deployed and simultaneously or near simultaneously using other radio resources on at least one frequency used for a HSPA deployment. The representative procedures may provide a plurality of radio resource connections, (e.g., one for each RAT concurrently used by the WTRU 102), that may control the respective radio resources. Such procedures in which a WTRU 102 concurrently operates (CO) using a plurality of RRC connections may be referred to as multi-RAT CO.

In certain representative embodiments, the WTRU 102 may transmit using different RATs in different time intervals (e.g., only in different time intervals, as a form of time division operation on a TTI basis) on the same or different frequencies or frequency bands.

In certain representative embodiments, the CC aggregation may use at least one frequency on a CC on which the WTRU 102 may operate according to a first RAT, and at least one frequency on a second CC on which the WTRU 102 may operate according to a second RAT.

For example, the WTRU 102 using multi-RAT CA procedures and using LTE and WCDMA/HSPA RATs may be configured based on:

(1) an initial access using LTE and additional resources using WCDMA/HSPA such that the WTRU 102 may initiate access using LTE to establish a single RRC connection to the LTE system; and/or (The network may reconfigure the WTRU 102 with additional resources for accessing the WCDMA/HSPA system using multi-RAT operation (e.g., the serving cells configured for LTE operation may correspond to a primary RAT and serving cells configured for WCDMA/HSPA operation may correspond to a secondary RAT); and/or (2) an initial access using WCDMA/HSPA and additional resources using LTE such that the WTRU 102 may initiate access using WCDMA/HSPA to establish a single RRC connection to the WCDMA/HSPA system.

(The network may then reconfigure the WTRU 102 with additional resources for accessing the LTE system using multi-RAT operation. In other words, the serving cells configured for WCDMA/HSPA operation may correspond to the primary RAT, while the serving cells configured for LTE operation may correspond to the secondary RAT.)

Although multi-RAT CA procedures are described using LTE and WCDMA/HSPA RATs, it is contemplated that the procedures may be applicable to any combination of any number of other RATs such as GSM, WCDMA, HSPA, HSDPA, HSUPA, LTE, 802.11b/g/n, IEEE 802.11y, 802.16a/h/j/n, 802.20 in IEEE, cdma2000 1× and/or cdma2000 EV-DO, among others.

For example, the WTRU 102 using multi-RAT CA procedures and using a 3GPP (e.g., HSPA and/or LTE) and WiFi RATs may be configured based on an initial access using a 3GPP RAT and additional resources using WiFi such that the WTRU 102 may initiate access using a 3GPP RAT to establish a single RRC connection to the 3GPP system. The network may reconfigure the WTRU 102 with additional parameters for accessing the WiFi system using multi-RAT operation (e.g., the serving cells configured for a first 3GPP RAT operation may correspond to a primary RAT and serving cells configured for WiFi operation may correspond to a secondary RAT). The parameters configured by the 3GPP RAT RRC connection and for accessing the WiFi system may be at least one of a frequency band of the WiFi network, a specific frequency (e.g., a channel) for the WiFi network, an operation mode for the WiFi network (e.g., Direct-Sequence Spread Spectrum (DSSS) or Orthogonal Frequency Division Multiplexing (OFDM)), an identity of the WiFi network (e.g. a Serving Set IDentifier (SSID)), an identity of the WiFi access point (e.g. a Basic SSID (BSSID) and/or a MAC identity), a set of one or more security parameters including at least one of a security protocol, an encryption algorithm and/or a security key. The configuration may include an indication to turn on (e.g. activate) the WiFi transceiver in the WTRU. The type of security protocol may be one of: a Wired Equivalent Privacy (WPA), Wi-Fi Protected Access (WPA) or WPA II (WPA2), among others. The type of encryption algorithm may be one of a Temporal Key Integrity Protocol (TKIP), or a Pre-Share Key mode (PSK), among others. The security key may be a string of hexadecimal digits, and/or a bitstring, among others, and may correspond to information (e.g., a passphrase) from which a WiFi device may further derive the encryption key using a known key derivation function.

The multi-mode WTRU 102 may be configured for multi-RAT operation such that different combinations of DLs and/or ULs (e.g., if any) of CCs of the secondary RAT may be used. For example, the following multi-RAT aggregation scenarios may be used:

(1) the WTRU 102 may be configured with at least one DL CC for the secondary RAT (e.g., only DL CCs);

(2) the WTRU 102 may be configured with at least one DL CC and at least one UL CC for the secondary RAT; and/or (3) the WTRU 102 may be configured with at least one UL CC for the secondary RAT (e.g., only UL CCs).

The WTRU 102 may operate on a plurality of CCs with at least two different CC associated with respectively different RATs. Certain representative procedures may be applicable when the first and the second CCs operate on the same frequency such that the WTRU 102 may operate according to a first RAT during a first period of time and according to a second RAT during a second period of time, (e.g., in a time-division manner).

The WTRU 102 may operate with a single RRC instance including a single state machine for the control plane. The RRC procedure may be performed on the radio resources of a first CC of the first RAT, and may be used to configure radio resources of at least one CC of the second RAT.

In certain representative embodiments, the multi-mode WTRU 102 may be configured using a radio resource connection procedure of the first RAT, performed on the radio resources of the serving cell of the first RAT, where the WTRU 102 is provided with a configuration for using additional radio resources of at least one CC of the second RAT. The WTRU 102 may operate with a single state machine for the RRC connection, which states and state transitions may correspond at least in part to those of the first RAT. The WTRU 102 may maintain the single RRC connection to the network, (e.g., on the primary serving cell (e.g., PCell) of the first RAT). The WTRU 102 may maintain the single RRC state machine using states and corresponding transitions of the first RAT. The WTRU 102 may maintain and may perform a single NAS connection on the first RAT (e.g., the PCell). For example, the NAS procedures, registrations, and/or NAS mobility information may be performed on the first RAT (e.g., only the first RAT)). The WTRU 102 may determine the security parameters, algorithms and/or other information used to perform the security procedures via the first RAT.

In certain representative embodiments, the CC(s) of the second RAT serving the WTRU 102 may be a DL CC or a UL CC.

In certain representative embodiments, the first RAT (e.g., of the PCell) serving the WTRU 102 may operate as an LTE RAT (e.g., may be configured for LTE operations) and the concerned DL CC or CCs of the second RAT (e.g., of the SCell) serving the WTRU 102 may operate as an HSDPA RAT (e.g., may be configured for HSDPA operation). In certain representative embodiments, the first RAT (e.g., of the PCell) serving the WTRU 102 may operate as an LTE RAT (e.g., may be configured for LTE operations) and the concerned DL CC or CCs of the second RAT (e.g., of the SCell) serving the WTRU 102 may operate as an HSUPA RAT (e.g., be configured for HSUPA operation).

In certain representative embodiments, the first RAT (e.g., of the PCell) may operate according to a WCDMA/HSPA RAT and the concerned DL CC or CCs of the second RAT (e.g., of the SCell) serving the WTRU 102 may operate as an LTE RAT (e.g., may be configured for LTE operations).

In certain representative embodiments, the first RAT (e.g., of the PCell) may operate according to a 3GPP RAT (e.g. a WCDMA/HSPA RAT, or a LTE RAT) and the concerned cell(s) of the second RAT (e.g., of the SCell) serving the WTRU 102 may operate as a WiFi RAT (e.g., may be configured for WiFi operations).

In certain representative embodiments, the concerned CCs of the second RAT may include at least one DL CC and one UL CC, and may correspond to the serving cell.

In certain representative embodiments, the first RAT may operate according to the LTE RAT and the serving cell configured for the second RAT may be configured for HSPA operation.

In certain representative embodiments, the first RAT may operate according to the WCDMA/HSPA RAT and the serving cell configured for the second RAT may be configured for LTE operation.

In certain representative embodiments, the representative procedures described herein may be applied to a pair of the concerned CCs in which one DL CC and one UL CC may be associated to form the serving cell of the WTRU 102, (e.g., a secondary serving cell, or a SCell).

In certain representative embodiments, the multi-mode WTRU 102 may support two or more of: (1) LTE; (2) WCDMA; (3) HSDPA; (4) HSUPA and/or (5) WiFi.

As one example, an LTE RRC reconfiguration procedure (e.g., without mobility control information), may be performed on radio resources of the serving cell (e.g., the PCell) on which the WTRU 102 is served and the serving cell may operate according to LTE RAT operations. The LTE RRC reconfiguration may include a radio resource configuration for at least one concerned CC of the second RAT on which the WTRU 102 may operate according to: WCDMA RAT operations, HSDPA RAT operations and/or HSUPA RAT operations. The WTRU 102 may maintain a single RRC state machine using the LTE states and corresponding transitions.

As another example, the multi-mode WTRU 102 may support LTE and WCDMA and/or HSDPA and/or HSUPA. A WCDMA/HSPA RRC reconfiguration procedure, (e.g., without mobility control information) may be performed on radio resources of the serving cell on which the WTRU 102 is served and the serving cell may operate according to WCDMA/HSPA RAT operations. The WCDMA/HSPA reconfiguration may include radio resource configuration for at least one concerned CC of the second RAT on which the WTRU 102 operates according to the LTE RAT operations. The WTRU 102 may maintain a single RRC state machine using the WCDMA/HSPA states and corresponding transitions.

The WTRU 102 may operate with one RRC instance and/or one RRC state machine for the control plane for each RAT for which at least one serving cell is configured. A subset or all of the RRC procedures specific to each RAT may be performed on the radio resources of the corresponding RAT independent of the RRC states of the other RAT or RATS. Parameters obtained using higher layer procedures, (e.g., NAS procedures) performed over the RRC connection of the first RAT may be used to configure corresponding parameters of the RRC connection of the second RAT. For example, these parameters may include a packet data protocol (PDP) context and a security context. In certain representative embodiments, parameters obtained using higher layer procedures, (e.g. NAS procedures) performed over the RRC connection of the first RAT may be used to configure parameters for the second RAT. For example, these parameters for accessing a WiFi system may include a frequency band, a specific frequency (e.g. a channel), an operation mode (e.g., DSSS or OFDM, among others), an identity of the WiFi network (e.g., SSID), an identity of the WiFi access point (e.g., BSSID), a set of one or more security parameters including at least one of a security protocol, an encryption algorithm and/or a security key. The configuration may include an indication to turn on (e.g. activate) the WiFi transceiver in the WTRU 102.

In certain representative embodiments, the multi-mode WTRU 102 may be configured for multi-RAT (or multi-CO) operation such that the WTRU 102 may operate with one state machine for each RRC connection (e.g., having states and state transitions that may correspond at least in part to those of the corresponding RAT).

In certain representative embodiments, the multi-mode WTRU 102 may support LTE and WCDMA (and/or HSDPA and/or HSUPA), and may be configured for multi-RAT operation with LTE as the primary RAT and WCDMA/HSPA as the secondary RAT. In certain representative embodiments, the multi-mode WTRU 102 may support LTE and WCDMA and/or HSDPA and/or HSUPA, and may be configured for multi-RAT operation with WCDMA/HSPA, as the primary RAT, and LTE, as the secondary RAT.

The WTRU 102 may operate with at least a common part of the user plane, (e.g., different possible combinations for the PDCP, RLC, and MAC layers), where a first part corresponds to the user plane of the first RAT and, if any, a second part corresponds to the user plane of the second RAT.

In certain representative embodiments, the multi-mode WTRU 102 configured for multi-RAT operation may access multiple RATs under the coordination/supervision of the network, (e.g., based on radio resource configuration and/or control signaling for scheduling). The WTRU 102 may first establish a control path (e.g., a single control path and/or a single RRC connection), to the network, (e.g., to the eNB 240 in case of LTE RRC). The network may setup a single user data path to/from the core network 106, (e.g., the IP gateway, the SGSN, the GGSN, access gateway and the like), while it may at any time transmit/receive the user data over a radio channel of any of the configured CCs for any RATs. From a network connectivity perspective, the WTRU 102 may be a single IP device with a single control (RRC connection) path and a single security context. The branching of the data path may be implemented for the case of a multi-mode WTRU operating with a multi-RAT configuration.

The following representative procedures describe how a WTRU 102 may handle branching of the data path (e.g., which may carry user plane data) and/or control plane data, when the multi-mode WTRU 102 is configured for multi-RAT operation. In a first representative procedure, branching may be performed under an IP layer and above a PDCP layer. For example, a separate PDCP/RLC/MAC chain (e.g., one chain) per set of configured CCs that belong to the same RAT may be implemented. The representative procedure may use one security context, (e.g., security parameters and keys), for each set of CCs, and each set of CCs may include their own security algorithms. For example, security on an LTE chain may be applied in the LTE PDCP and security for the HSPA chain may be applied in an RLC layer. Additional network signaling may use a new network interface and may signal between a UTRA RNC (PDCP, RLC) in the network and the LTE eNB 242, (e.g., if LTE is used for the RRC connection).

In a second representative procedure, the branching may be performed under the PDCP layer and above the RLC layer. For example, a common PDCP entity may handle the RLC/MAC chain for each set of CCs that belong to the same RAT. When the WTRU 102 operates with at least one LTE serving cell as the first RAT, and is configured with at least one CC of the second RAT that is, for example, WCDMA and/or HSDPA (and/or HSUPA) or WiFi. If the LTE PDCP is used, the WTRU 102 may use a single security context/ algorithms and, if configured, may use a single header compression context. Additional network signaling may use a new network interface and may signal between a UTRA RNC (PDCP, RLC) in the network and the LTE eNB 242, (e.g., if LTE is used for the RRC connection).

In a third representative procedure, the branching may be performed under the RLC layer and above a respective MAC entity of each set of CC belonging to the same RAT. For example, a common PDCP entity and a common RLC entity may handle at least one MAC entity for each set of CCs that belong to the same RAT.

When the WTRU 102 operates with at least one LTE serving cell as a first RAT, and is configured with at least one CC of the second RAT that is, for example, WCDMA and/or HSDPA (and/or HSUPA). If the LTE PDCP is used, the WTRU 102 may use a single security context/algorithms, and, if configured, may use a single header compression context, and LTE RLC may be used for segmentation/ resegmentation and reassembly.

In a fourth representative procedure, the branching may be performed in the MAC entity above a respective HARQ entity of each set of CCs belonging to the same RAT. For example, individual scheduling and resource management entities may be used that manage the resources and that determine the transport block size of each RAT. The transport block created on each RAT may include a common MAC header format that may be transmitted on one or more other RATS (e.g., different RATs) over the respective CCs.

The WTRU operation may be applied based on associations between CCs across RATs. The operations described herein may be applied to combinations of CCs belonging to different RATs using some form of association. The association between multiple configured CCs for a given WTRU 102 may be based on, for example, at least one of the following procedures (e.g., which may be applicable to all of the embodiments when applied to CCs of different RATs). For example, a set of configured CCs may use: (1) "dedicated-linking," (e.g., based on a configuration signaled to the WTRU 102 using dedicated signaling); (2) "scheduling-linking," (e.g., based on the CC being addressable for scheduling from the control channel of a first CC used for the scheduling of a second CC); and/or (3) "HARQ feedback-linking," (e.g., based on the HARQ feedback relationship either for DL and/or for UL feedback, and/or the use of other types of control signaling between the base station and the WTRU across CCs operating using different RATs). The configured CCs may be based on "scheduling-linking," (e.g., based on associations such as those derived from cross-carrier scheduling on a control channel of the first CC for transmissions for the second CC of a different RAT).

The radio resource reconfiguration message may include a configuration or a reconfiguration of the multi-RAT such that the WTRU 102 may add, modify and/or remove at least part of the radio configuration for operation on the secondary RAT and/or the configuration for at least one of the serving cell of the secondary RAT.

A handover command may include a configuration of the multi-RAT such that the WTRU 102 may resume multi-RAT operation at handover to another eNB 242 for both the first RAT and the second RAT.

In certain representative embodiments, a multi-mode WTRU 102, for example, may monitor radio link quality, may detect radio link problems, may declare failure for a CC and/or may take other actions, when it is configured for multi-RAT operation.

In a first representative embodiment, when the WTRU 102 detects insufficient radio quality, (e.g., if a radio link failure (RLF) is determined) on a CC of the second RAT, it may take certain actions and may notify the network using radio resources of a CC of the first RAT.

In a second representative embodiment, the multi-mode WTRU 102 may be configured for multi-RAT operation and may determine that the radio quality is insufficient (e.g., if the RLF is determined) of at least one CC of a second RAT and it may notify the network using radio resources of a CC of a first RAT.

In certain representative embodiments, the notification may be a L3 message (e.g., RRC) and/or a L2 message, (e.g., MAC CE).

In certain representative embodiments, the WTRU 102 may determine that the radio quality is insufficient, (e.g., a RLF) for a CC of the second RAT that is used as a path loss reference for UL transmissions.

In certain representative embodiments, the first RAT may be an LTE RAT and the second RAT may be a WCDMA RAT and/or HSDPA RAT (and/or HSUPA RAT).

If the WTRU 102 is configured with RAT-specific measurements, when a measurement configuration event triggers a measurement report, the WTRU 102 may either transmit (1) a report for all configured and available measurements for all configured RATs or (2) the WTRU 102 may transmit (e.g., only transmit) measurement reports for the RAT that triggered the measurements report. Which report is transmitted by the WTRU 102 may be configured by higher layers.

In certain representative embodiments, a multi-mode WTRU 102 may perform a random access procedure, when it is configured for multi-RAT operation. Control signaling for requesting the WTRU 102 to perform the random access procedure in the second RAT may be received on a CC of the first RAT.

In certain representative embodiments, the multi-mode WTRU 102 may be configured for multi-RAT operation and may initiate the random access procedure using resources of a CC of the second RAT based on control signaling received in a CC of the first RAT.

In certain representative embodiments, the first RAT may be an LTE RAT and the second RAT may be a WCDMA RAT and/or a HSDPA RAT (and/or a HSUPA RAT).

In certain representative embodiments, the first RAT may be a WCDMA RAT and/or a HSDPA RAT (and/or a HSUPA RAT) and the second RAT may be a LTE RAT.

In certain representative embodiments, the first RAT may be a 3GPP RAT (e.g. WCDMA RAT and/or a HSDPA RAT and/or a HSUPA RAT, or a LTE RAT) and the second RAT may be a WiFi RAT.

In certain representative embodiments, the control signaling may be an order from the network to perform random access received on the PDCCH of a CC of the first RAT.

In certain representative embodiments, a random access response received on a CC of the first RAT may include a grant that is applicable for a transmission on a CC of the second RAT. For example, the WTRU 102 may receive dedicated parameters of the second RAT, such as a dedicated random access preamble, in a random access (RA) response. Control signaling for scheduling of a CC of the second RAT may be received on a CC of the first RAT.

In certain representative embodiments, a multi-mode WTRU 102 may be configured for multi-RAT operation and may determine whether or not radio resources are allocated to the WTRU 102 for a transmission on at least one CC of the second RAT based on control signaling received in the first RAT.

In certain representative embodiments, the control signaling, (e.g., one or more grants and/or assignments) may be received on the physical data transport channel of the first RAT, (e.g., on a resource block of the PDSCH for LTE).

In certain representative embodiments, the first RAT may be an LTE RAT and the second RAT may be a WCDMA RAT and/or a HSDPA RAT (and/or a HSUPA RAT) and the control signaling for scheduling may be received on the LTE PDCCH. The scheduling may be received on the PDCCH of a CC configured by RRC for cross-carrier scheduling of the concerned CC of the second RAT.

In certain representative embodiments, the Downlink Control Information (DCI) may be used to schedule transmissions on radio resources of the second RAT and may be in a DCI format that may be specific to the type of RAT that is being cross-carrier scheduled. The DCI format may be scrambled using a specific Radio Network Temporary Identifier (RNTI), which may indicate the identity of the CC of the second RAT. The DCI format may be received in a WTRU-specific search space of the PDCCH of a CC of the first RAT. The search space may be specific to at least one CC of the second RAT. The search space may not overlap with any other search space and the successful decoding of the DCI format in the search space may implicitly determines the identity of the CC of the second RAT to which the DCI is applicable (e.g., associated with).

In certain representative embodiments, the WTRU 102 may not decode any control signaling for the scheduling of a CC of the second RAT, when the CC is deactivated and/or if the CC may not be scheduled based on a power saving algorithm applicable to at least the CC. Control signaling for Activation/Deactivation of a CC of the second RAT may be received on a CC of the first RAT.

In certain representative embodiments, the multi-mode WTRU 102 may be configured for multi-RAT operation and may determine the activation/deactivation state of at least one CC of the second RAT based on control signaling received in the first RAT.

In certain representative embodiments, the control signaling may be received using: (1) L1 signaling, (e.g., via a LTE PDCCH or HSPA HS-SCCH order); (2) L2 signaling (e.g., via a MAC CE); (3) L3 signaling (e.g., via a RRC service data unit (SDU) which may be used as part of the configuration message that adds at least one CC of the second RAT to the WTRU's configuration).

In certain representative embodiments, the first RAT may be an LTE RAT and the second RAT may be a WCDMA RAT and/or a HSDPA RAT (and/or a HSUPA RAT) and the control signaling for activation/deactivation may be carried using a MAC CE. The MAC CE may include a bitmap where at least one bit may be used for each configured CC (or serving cell) of the second RAT and the bit may represent the activation state of an individual the CC. The mapping of a bit in the bitmap may be configured using dedicated RRC signaling when adding the CC, either based on an explicit serving cell identity based on: (1) an order of the serving cell identity of the configured secondary serving cell or serving cells for the WTRU 102; (2) the configuration order of the serving cells; (3) and/or any other similar procedure.

In certain representative embodiments, the first RAT may be HSPA, (e.g., which may include both UL HSUPA and DL HSDPA), and the second RAT may be an LTE RAT and the control signaling for activation/deactivation may be carried using a HS-SCCH order. In a first example, the multi-cell HS-SCCH order type may be used to control the activation/deactivation status of the serving cells across both RATs. The order of the serving cells (e.g., controlled by the HS-SCCH order) may be set according to an explicit network configuration such that each serving cell from both RATs may be assigned a serving cell ID. In certain representative embodiments, the order of the serving cells may be determined according to a predetermined rule, for example, the cells of the first RAT may be the first ones in order of the serving cell IDs or in order of the configuration and the serving cells of the secondary cells may be the next ones according to the order the serving cell IDs or according to a configuration order.

In certain representative embodiments, a new HS-SCCH order type may be used to control the activation/deactivation of the cells in the secondary RAT. The mapping of the order bits and the combination of the order bits to the serving cells may follow similar rules to the multi-cell HS-SCCH order type.

In certain representative embodiments, the multi-mode WTRU 102 configured for multi-RAT operation may determine the activation/deactivation state of at least one CC of the second RAT such that: (1) activation control may be performed based on control signaling received in the first RAT and/or (2) deactivation control may be performed based on control signaling received in the first RAT.

In certain representative embodiments, the multi-mode WTRU 102 configured for multi-RAT operation may determine the activation/deactivation state of at least one CC of the second RAT such that deactivation control may be performed based on a deactivation timer that may be applicable either to: (1) each configured CCs individually; (2) a subset of configured CCs (e.g., based on configured CCs of a same RAT type); and/or (3) all configured CCs.

In certain representative embodiments, the multi-mode WTRU 102 configured for multi-RAT operation may determine whether or not it may: (1) decode the control signaling for scheduling, (e.g., PDCCH for PDSCH/PUSCH scheduling for LTE); and/or (2) transmit on configured periodic resource, if any, of a configured UL CC, (e.g., periodic CQI/PMI/RI reporting on PUCCH in LTE, or PCI reporting in HSPA).

In certain representative embodiments, procedures may allow DRX operation across two RATs. Representative procedures to perform DRX in both RATs may include the use of different parameters, operations, restrictions, and/or timing for DRX in the aggregated RATs.

In a first representative embodiment, both RATs may use a common DRX status, (e.g., long/short DRX or active/not active status) and configuration. For example, one common DRX configuration may be provided on a first RAT and may be used across both RATs. To achieve time alignment across the two RATs and to ensure the correct reception of the scheduling channel on the second RAT, the DRX parameters provided for the first RAT may be multiples of the TTI length of the other RAT (e.g., if the TTI length of the first RAT is greater than the TTI length of the second RAT). For example, when an LTE RAT is the first RAT and an HSPA RAT is the second RAT, the DRX parameters, such as cycles, on durations and/or offsets may be a multiple of 2 ms or equivalently multiples of two LTE sub-frames.

In certain representative embodiments, triggers that may cause the WTRU 102 to transition to continuous or discontinuous reception on the first RAT, may cause the WTRU 102 to transition to continuous reception on the second RAT. The initiation of a DRX or the on duration may correspond to the subframe boundary of both RATs.

In certain representative embodiments, the DRX may be independent across both RATs. For example, the DRX configuration and orders may be independently provided for each RAT and may allow realization of scenarios in which different services are transmitted over different RATs, while optimizing battery saving opportunities, (e.g., voice on HSPA and web browsing on LTE).

In certain representative embodiments, the configuration, (e.g., cycles and/or on durations, among others), may be common across the RATs, while the status and triggers to go in and out of DRX may be different across the RATs.

In certain representative embodiments, control signaling received in a first RAT may be considered or used in the power saving algorithm of the second RAT such that scheduling activity in the first RAT may trigger, for example, a change in a DRX state in the second RAT. For example, control signaling received in the first RAT for cross-carrier scheduling of data on resources of the second RAT may be used (e.g., considered) as control signaling received in the second RAT for the power saving algorithm of the second RAT.

In certain representative procedures, a multi-mode WTRU 102 may be configured for multi-RAT operation and may determine whether or not it may use resources of the first RAT or of the second RAT to request UL transmission resources. For example, for the WTRU 102 that is configured with UL resources (e.g., only UL resources) for the first RAT, (e.g., in a multi-RAT CA scenario), the WTRU 102 may use the scheduling request procedure of the first RAT to request UL resources. In other representative procedures, for the WTRU 102 that is configured with additional UL resources (e.g., for the second RAT, the WTRU 102 may determine which scheduling request (SR) procedure to use based on, for example, which resources to use in which CC. The determination of the SR procedure may be a function of at least one of:

(1) the next occurrence in time of a SR transmission occasion, across configured UL resources (e.g., all configured UL resources) for the SR on the CCs (e.g., any CCs), for example, to minimize latency;

(When an SR is triggered, the WTRU 102 may select the next available UL resource for the SR transmission (e.g., only considering activated UL carriers). In certain representative embodiments, the WTRU 102 may use a deactivated carrier configured with such resource, and may implicitly activate at least the CC.)

(2) the type of data that triggered the SR; (For example, if the data bearer for which data has triggered the SR is configured such that the data may be transmitted on radio resources of the second RAT, then, if configured and/or available, the WTRU 102 may use the SR resources of the second RAT to signal for UL radio resources on the second RAT);

(3) whether or not the WTRU 102 may perform other UL transmissions in the same subframe on any other configured and active CC, and the type of transmissions;

(For example, if a WTRU 102 performs an UL transmission in a CC of the first RAT, it may perform the SR transmission on the resources of the second RAT instead of the resources of the first RAT, if available.)

The resource or resources to use in which CC may be a function of an association between a type of data and a specific RAT. The type of data may be a function of one or more of: (1) the transport service, (e.g., TCP, UDP, and/or RTP, among others); (2), the QoS requirements or thresholds (e.g., QCI, maximum delay, and/or maximum packet loss rate, among others); (3) the associated logical channel and/or logical channel group; (4) the type of radio bearer, (e.g., signaling radio bearer (SRB) or data radio bearer (DRB)); (5) the operator's policy for the type of data or the type of application, (e.g., voice, background traffic, best effort, and/or real-time, among others) (e.g., configured by RRC in a semi-static manner).

Which resource to use in which CC may be a function of the estimated radio link quality (e.g., a function of the latest measurements (such as reference signal received quality (RSRQ) and/or reference signal received power (RSRP)), or a carrier on which the WTRU 102 is not experiencing insufficient radio quality, (e.g., radio link failure (RLF)).

The resource or resources to use in which CC may be a function of the type of RAT. For example, when the SR is triggered, the WTRU 102 may select (e.g., may always select) a CC of the first RAT. For example, the WTRU 102 may select (e.g., always select) the PCell of the first RAT.

In certain representative embodiments, the above procedures may consider (e.g., use) available (e.g., only available) dedicated resources configured for the SR. When the WTRU 102 does not have configured dedicated resources for the SR in at least one of the RATs, it may use (e.g. consider) random access resources (e.g., random access (RA)-SR) and may use similar procedures as those described above for the RACH resource or resources. The WTRU 102 may also use both the dedicated resources and the random access resources of configured (e.g., all configured) CCs, when using the above procedures.

The WTRU 102 may report one or more RAT-specific buffer status reports (BSRs), in the case of at least one SRB map and/or DRB map to one or more CCs of a single RAT.

In certain representative embodiments, a multi-mode WTRU 102 may be configured for multi-RAT operation and may determine one or more transport blocks to use for transmission of different types of data and/or control signaling, when the multi-mode WTRU 102 is configured for multi-RAT operation.

Which transport block or blocks to use may be a function of: (1) the type of service (e.g., VoIP service, best-effort service, TCP service, gaming service, and/or browsing service, among others); (2) the type of radio bearer (e.g., SRB and/or DRB, among others); (3) the QoS channel indication (QCI); (4) associated SRB/DRB priority (or lack of the associated SRB/DRB priority); (5) associated logical channel (LCH)/logical channel group (LCG); (6) an explicit indication that the data to or data from a given radio bearer may be transmitted using a transport block of a specific CC; and/or (7) the RAT type. The CC may be determined based on at least one of: (1) the type of RAT, (e.g., LTE and/or HSPA, among others); (2) an identity corresponding to the CC, (e.g., SCell ID); (3) the size of the transport block; (4) an explicit indication in the control signaling for scheduling, (e.g., a flag in a LTE DCI received on the PDCCH when cross-carrier scheduling is used); and/or (5) the type of transport channel associated to the transport block, among others.

The WTRU 102 may transmit data on particular UL radio resources as a function of the type of data, (control signaling/control plane/user plane), and the type of allocated radio resources.

In certain representative embodiments, a multi-mode WTRU 102 configured for multi-RAT operation may determine data to be transmitted on a particular UL resource based on the data's association to a specific radio bearer, (e.g., SRB, DRB, LCH, and/or LCG, among others), and/or based on the type of RAT of the CC of the concerned transport block.

In certain representative embodiments, the WTRU 102 may determine that data associated with a specific SRB may be transmitted (e.g., may always be transmitted) in the UL using the resources of the first RAT.

In certain representative embodiments, the WTRU 102 may determine that data associated with a specific DRB (an/or a specific LCH/LCG) may be transmitted on a transport block of a CC that belongs to either the first RAT or to the second RAT based on a configuration of the WTRU 102, for example, when the WTRU 102 may be explicitly configured by the network using RRC to transmit data from the DRB using radio resources of the second RAT (e.g., for data of a VoIP service).

In certain representative embodiments, the WTRU 102 may determine that a MAC CE for reporting (e.g., buffer status, power headroom and/or other similar UL scheduling control information) may be transmitted on a transport block of a CC that belongs to either the first RAT or to the second RAT based on a configuration of the WTRU 102, e.g., when the radio resources of the first RAT may be used (e.g., always used) for transmission of BSR, and/or power headroom report (PHR), among others.

In certain representative embodiments, the first RAT may be LTE and the second RAT may be WCDMA and/or HSDPA (and/or HSUPA). The transmission of UL Control Information (UCI) corresponding to at least one CC of the second RAT may be transmitted on UL transmissions of a CC of the first RAT.

The UCI may include: (1) HARQ A/N feedback for DL transmissions; (2) the channel quality indication (CQI); (3) precoding matrix information (PMI); (4) a scheduling request (SR); (5) RI; and/or (6) the PCI, among others. Typically, HARQ A/N feedback may be transmitted to inform the network about the status of one or more DL transmissions, (e.g., a transport block, or a codeword), for a given TTI and CQI/PMI/RI, which may be typically reported based on a periodic configuration and/or an explicit request from the network. The SR may be transmitted to inform the network that there may be UL data to transmit.

For the WTRU 102 operating in multiple RATs, a UL control channel for HARQ ACK/NACK and/or for CQI/PMI/RI reports may not be available for the second RAT (e.g., in the case where no (and/or insufficient) UL resources are configured, no (and/or insufficient) UL resources are allocated, no (and/or insufficient) UL resources are activated, and/or for any other reasons which may prevent the WTRU 102 from performing transmissions on the control channel (e.g., insufficient available transmission power, invalid timing alignment, invalid path loss reference, and/or a RLF detected, among others). In such cases, one representative procedure may enable the WTRU 102 to transmit at least part of the UCI corresponding to the second RAT on UL resources of the first RAT. In certain representative procedures, the multi-mode WTRU 102 configured for multi-RAT operation may transmit (e.g., always transmit) at least part of the UCI corresponding to the second RAT on UL resources of the first RAT.

In certain representative embodiments, the multi-mode WTRU 102 configured for multi-RAT operation may also be configured to use the UL resources of the first RAT to transmit at least parts of the UCI corresponding to the second RAT. In certain representative embodiments, the first RAT may be an LTE RAT and the second RAT may be a WCDMA RAT and/or an HSDPA RAT and/or HSUPA RAT. In certain representative embodiments, the first RAT may be a 3GPP RAT (e.g., LTE RAT, or WCDMA RAT and/or an HSDPA RAT and/or HSUPA RAT) and the second RAT may be a WiFi RAT.

In certain representative embodiments, the UL resources of the first RAT used may be in a PUCCH format, (e.g., a LTE PUCCH Format 3).

In certain representative embodiments, a set of UL resources of the first RAT may be used for channel selection on the resources, (e.g., LTE channel selection using any of PUCCH Format 1a/1b/2a/2b, or PUCCH Format 3).

In certain representative embodiments, the UL resources of the first RAT used may consist of or include a PUSCH transmission, for example, in the PCell of the WTRU's LTE configuration, if the WTRU 102 is configured for carrier aggregation (CA) for the LTE RAT.

In certain representative embodiments, at least parts of the UCI may be transmitted on a first UL resource of the first RAT, and another part may be transmitted on a second UL resource of the first RAT. For example, the WTRU 102 may transmit HARQ ACK/NACK bits on a PUCCH resource and CQI/PMI/RI bits may be transmitted on a PUSCH transmission (either on the PCell, or on a SCell).

The following representative procedures enable the WTRU 102 to perform power headroom reporting, when the multi-mode WTRU 102 is configured for multi-RAT operation. For the multi-mode WTRU 102 configured for multi-RAT operation, when calculating the available power headroom for a set of CC of each RAT type, the WTRU 102 may use the total transmission power across sets (e.g., all sets) of CCs. In certain representative procedures, the transmission power may be based on activated (e.g., only activated) UL carriers in each set.

In a first representative procedure, when the WTRU 102 receives a radio resource configuration that adds at least one CC of the second RAT, the WTRU 102 may trigger a PHR for each configured serving cell that have configured UL resources, for CCs of the first RAT and the CCs of the second RAT (e.g., the PHR may be triggered for a portion or all of the UL resources, for example for all serving cells or only activated serving cells).

In a second representative procedure, when the WTRU 102 receives control signaling that activates at least one CC of the second RAT, the WTRU 102 may trigger a PHR for each configured serving cell that have configured UL resources, for CCs of the first RAT and CCs of the second RAT (e.g., the WTRU 102 may trigger a portion or all of the UL resources, for example for all serving cells or only activated serving cells).

In a third representative procedure, the multi-mode WTRU 102 configured for multi-RAT operation may trigger a PHR for all CCs configured for the WTRU 102 and any RAT type (e.g., for activated (e.g., only activated) serving cells with configured UL resources, if the WTRU 102 receives a radio resource configuration that adds at least one CC of the second RAT. The WTRU 102 may receive activation/deactivation control signaling that may activate at least one CC of the second RAT and/or may deactivate at least one CC of the second RAT. In certain representative procedures, the first RAT may be LTE and the second RAT may be WCDMA and/or HSDPA (and/or HSUPA).

In certain representative embodiments, handling of different subframe timing for scheduling-related operations across carriers of different RATs may be implemented.

When the transmission time interval (TTI) of HSPA physical channels is 2 ms, (e.g., about 2 ms for HS-PDSCH) and the subframe duration of LTE physical channels, (e.g., PDSCH) may be 1 ms (e.g., about 1 ms), the following representative embodiments may describe timing relationships between the reception of control signaling on a DL physical channel of the first RAT for a transmission on a physical channel of the second RAT and for cross-carrier scheduling, activation/deactivation, and/or any other procedure affected by the control signal, (e.g., DRX timers, and/or Time Alignment Timers, among others).

When the control signal is received on the first RAT in a subframe N1 corresponding to the subframe timing of the first RAT, the corresponding subframe N2 corresponding to the subframe timing of the second RAT and used for deriving the timing for performing the corresponding operation on a physical channel of the second RAT may be determined according to any of the following subframe N2: (1) during which or at the start of which subframe N1 may start; (2) which may be the first subframe at which a starting boundary occurs during subframe N1; (3) which may be the first subframe at which a starting boundary occurs during which or at the end of which subframe N1 ends; (4) which may be the first subframe at which a starting boundary occurs after the end of subframe N1. The determination using subframe N2 may be responsive to the first RAT being HSPA (e.g., with a 2 ms TTI) and the control signaling being received in subframe N1, (e.g., the HS-SCCH).

When the above timing is used and when scheduling of a HSPA transmission, (e.g., HS-PDSCH), for a given serving cell is performed on a LTE control channel, (e.g., PDCCH), the reception timing of the LTE control signal, (e.g., PDCCH), may be used to derive the reception timing for the HSPA transmission, (e.g., HS-PDSCH), on the corresponding serving cell.

When the above timing is used and when scheduling of the PDSCH transmission for a given serving cell is performed on a HSPA control channel, the reception timing of the HSPA control signal may be used to derive the PDSCH reception timing on the corresponding serving cell.

If the first RAT is LTE (e.g., with a 1 ms TTI), multi-RAT aggregation in the MAC may be performed.

In certain representative embodiments, procedures to configure the multi-mode WTRU 102 using a single radio resource connection, (e.g., RRC), on the first RAT, (e.g., LTE or HSPA), with at least one DL CC of the second RAT, (e.g., HSPA or LTE respectively) may be implemented.

Although LTE and HSPA are described as representative RATs for carrier aggregation, it is contemplated that other RATs, e.g., disclosed above and, for example, a WiFi RAT, may be equally applicable.

Although various representative procedures are described herein in the context of DL, it is contemplated that they are equally applicable to the UL.

In certain representative embodiment, procedures may allow aggregation of the first RAT and the second RAT such that the data plane and the control plane may be aggregated using a common PDCP/RLC of the primary RAT and the data may be separated at the MAC layer between the MAC of a primary RAT and the MAC of a secondary RAT. In this representative scenario, the primary RAT may establish the control plane and the user plane, the user plane and control plane protocol stack may comprise a PDCP, a RLC, a RRC, and a NAS of the primary RAT and a MAC and PHY of both primary and secondary RATs.

In certain representative embodiments, the logical channels, (e.g., the DTCH, DCCH, and/or CCCH), of the primary RAT may be mapped to the LTE DL-SCH and/or to HSPA DL HS-DSCH transport channels, which may then be mapped to LTE PDSCH and HSPA HS-DPSCH physical channels, respectively.

Figure 3:
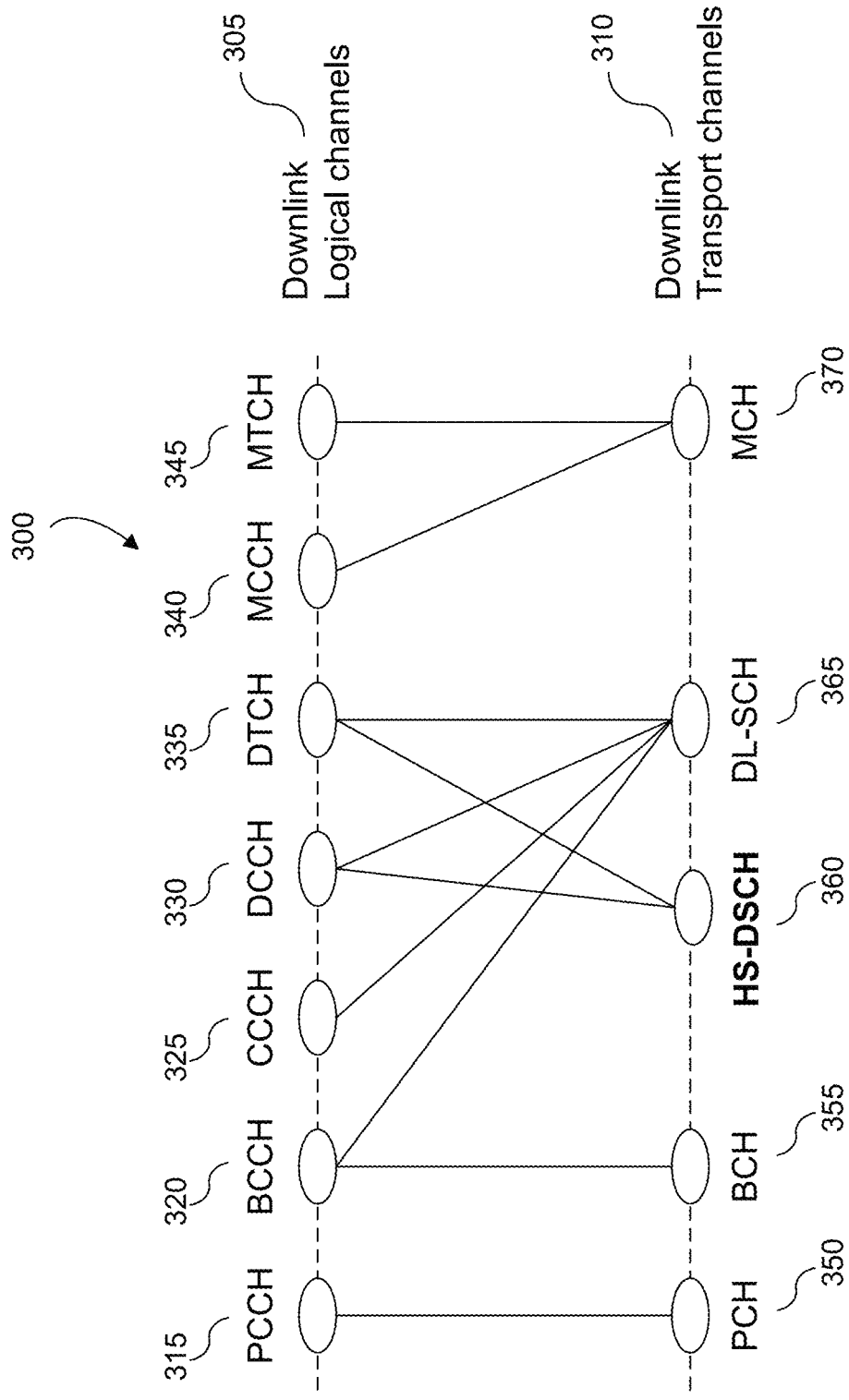
FIG. 3 is a diagram illustrating a representative mapping of downlink (DL) logical channels to DL transport channels.

FIG. 3 is a diagram illustrating a mapping 300 of representative DL logical channels to transport channels, where LTE is the primary RAT and both user plane and control plane data or logical channels may be mapped to LTE DL-SCH or HSPA HS-DSCH.

The DL logical channels 305 may include:
(1) a Paging Control Channel (PCCH) 315 configured as a DL channel that may transfer paging information and SI change notifications (e.g., the channel may be used for paging when the network does not know the location cell of the WTRU 102);
(2) a Broadcast Control Channel (BCCH) 320 configured as a DL channel for broadcasting system control information;
(3) a Common Control Channel (CCCH) 325 configured as a channel for transmitting control information between the WTRU 102 and the network (e.g., the channel may be used for the WTRUs having no RRC connection with the network);
(4) a Dedicated Control Channel (DCCH) 330 configured as a point-to-point bi-directional channel that may transmit dedicated control information between the WTRU 102 and the network and may be used by the WTRUs 102 having an RRC connection;
(5) a Dedicated Traffic Channel (DTCH) 335 configured as a point-to-point channel, dedicated to one WTRU 102, for the transfer of user information (e.g., the DTCH 335 can exist in both UL and DL);
(6) a Multicast Control Channel (MCCH) 340 configured as a point-to-multipoint DL channel that may be used for transmitting MBMS control information from the network to the WTRU 102, for one or several Multicast Traffic Channel s (MTCHs) 345 (e.g., the MCCH 340 may be used (e.g., may only be used) by WTRUs 102 that may receive MBMS; and/or
(7) a MTCH 345 configured for the transmission of multicast data.

The DL transport channels 310 may include:
(1) a Paging Channel (PCH) 350 which maps to the PCCH 315 and may support UE discontinuous reception (DRX) to enable WTRU 102 power saving (e.g., the DRX cycle may be indicated by the network to the WTRU 102) and may be broadcast;
(2) a Broadcast Channel (BCH) 355 which may map to the BCCH 320;
(3) a High-Speed Downlink Shared Channel (HS-DSCH) 360, which may map to the DCCH 330 and/or the DTCH 335 and may enable at least 3 physical layer channels (not shown) (e.g. a High Speed-Shared Control Channel (HS-SCCH) an Uplink High Speed-Dedicated Physical Control Channel (HS-DPCCH) and a High Speed-Physical Downlink Shared Channel (HS-PDSCH) such that the HS-SCCH may inform the user that data is to be sent on the HS-DSCH (e.g., 2 slots ahead), the HS-DPCCH may carry acknowledgment information and the current CQI of the user. This value may be used by the base station (e.g., base stations 114 and/or 234) to calculate how much data to send to the user devices on the next transmission and the HS-PDSCH may be the channel mapped to the HS-DSCH 360 transport channel that may carry actual user data);

(4) a Downlink Shared Channel (DL-SCH) 365 which may be mapped to the BCCH 320, the CCCH 325, the DCCH 330 and/or the DTCH 335 (this transport channel may be the main channel for DL data transfer.

(5) a Multicast Channel (MCH) 370 may be mapped to the MCCH 340 and/or the MTCH 345, may be broadcast in the entire coverage area of the cell, and may be used to transmit MCCH information to set up multicast transmissions.

When HSPA is the primary RAT, a mapping similar to that shown in FIG. 3 may apply. Even though not shown in FIG. 3, the CCCH logical channel may also be mapped to the HS-DSCH 360 transport channel. In certain representative embodiments, the aggregation may be performed for user plane data or logical channels, (e.g., only for DTCH 335), and the control plane logical channels, (DCCH 330 and/or CCCH 325), may be mapped to the primary RAT logical channels. In certain representative embodiments, the aggregation may be performed for dedicated logical channels, (e.g., DCCH 330 and DTCH 335), and common logical channels such as the CCCH 325 may be mapped to the primary RAT. In certain representative embodiments, for each logical channel established, an explicit configuration may be used to indicate whether the configured logical channel may be mapped over two RATs, only over the primary RAT, or only over the secondary RAT.

For DL aggregation only, in one example where LTE is the primary RAT, the UTRA DL secondary cells may be limited to the transmission of the HS-SCCH and HS-DPSCH physical channels and may be CPICH for the associated WTRU 102. For UL aggregation, a number of additional physical channels may be configured to allow the proper operation of UTRA UL.

In one example, where HSPA is the primary RAT, for DL aggregation, the E-UTRA secondary cells may include transmission of at least: PDSCH, PDCCH, CRS, CSI-RS, or any signaling used by the WTRU 102 to decode the DL data and perform correct channel estimation.

In one representative scenario, the LTE may be configured, as a primary RAT. In this representative scenario, one LTE PDCP and one LTE RLC entity may be established per configured bearer, in addition to or in lieu of the LTE NAS and, for example, RRC. The PDCP and RLC may be common and the data may be scheduled on either the LTE MAC or UMTS MAC. The UMTS MAC, over which the LTE logical channels may be scheduled, may correspond to an MAC-ehs entity, and the MAC-ehs entity functionality (e.g., all the MAC-ehs entity functionality) may be maintained or a new MAC entity may be used. For UL multi-RAT aggregation, the UMTS MAC may correspond to MAC-i/is or to a new MAC. Procedures are described below that may achieve multi-RAT aggregation when LTE is a primary RAT and HSPA is a secondary RAT.

The interaction between the HSPA MAC, LTE MAC and the physical layers may be similar to the DL, for UL aggregation of HSPA with LTE, as the first RAT, the LTE logical channels may be mapped to either UL-SCH or to E-DCH. In this example, data from any RLC logical channel or data from logical channels that may be allowed to be transmitted over both RATs, may be multiplexed and mapped over either a HS-DSCH (or E-DCH) transport channel or DL-DSCH (or UL-PUSCH) transport channels.

For the DL, the LTE WTRU 102 may receive and de-multiplex data for any logical channel from either a HS-DSCH transport channel or DL-DSCH transport channels and the corresponding physical channels.

Figure 4:
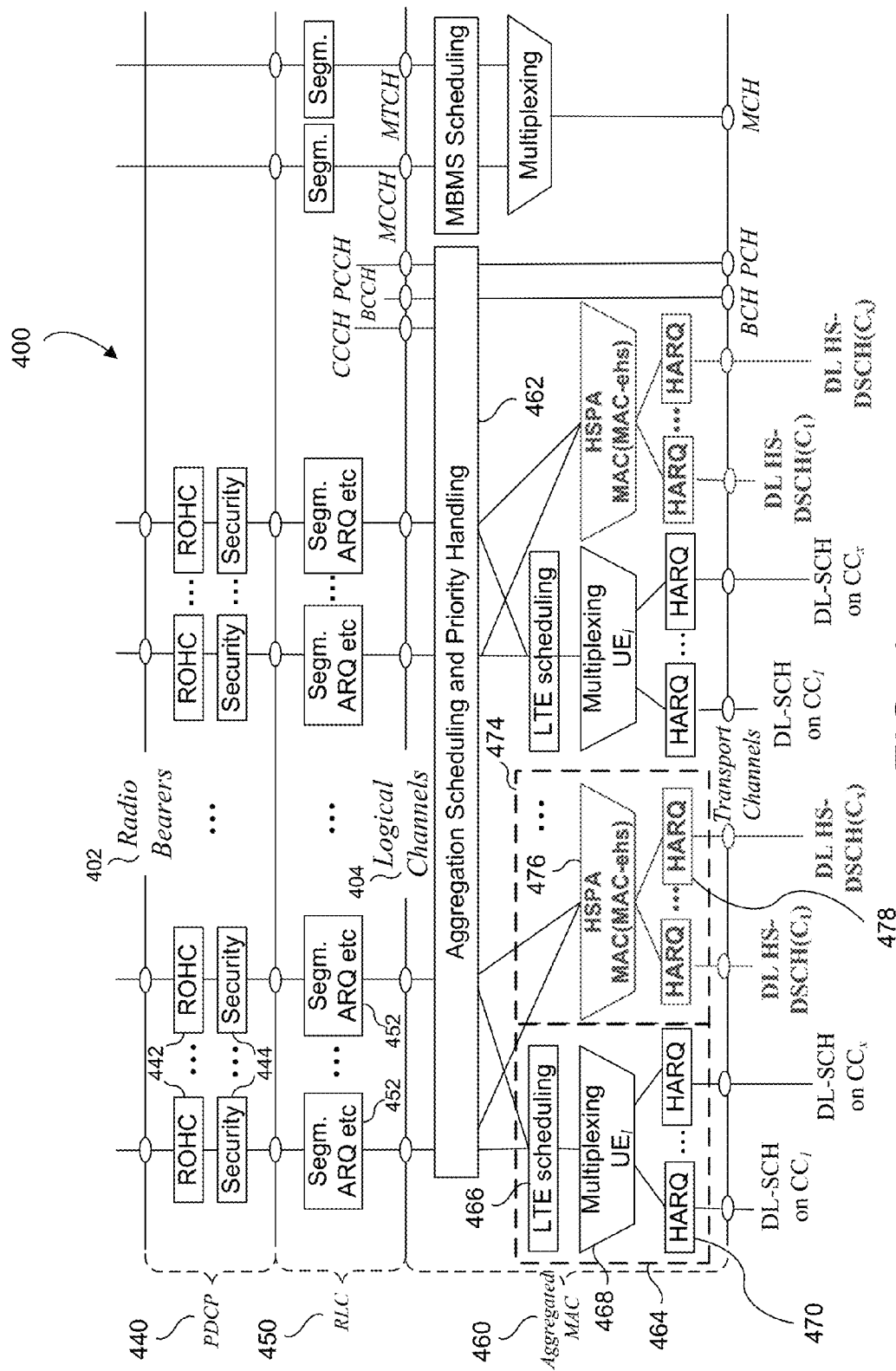
FIG. 4 is a diagram illustrating a representative multi-RAT layer 2 (L2) DL structure.

FIG. 4 is a diagram illustrating a representative Layer 2 (L2) structure 400.

Figure 5:
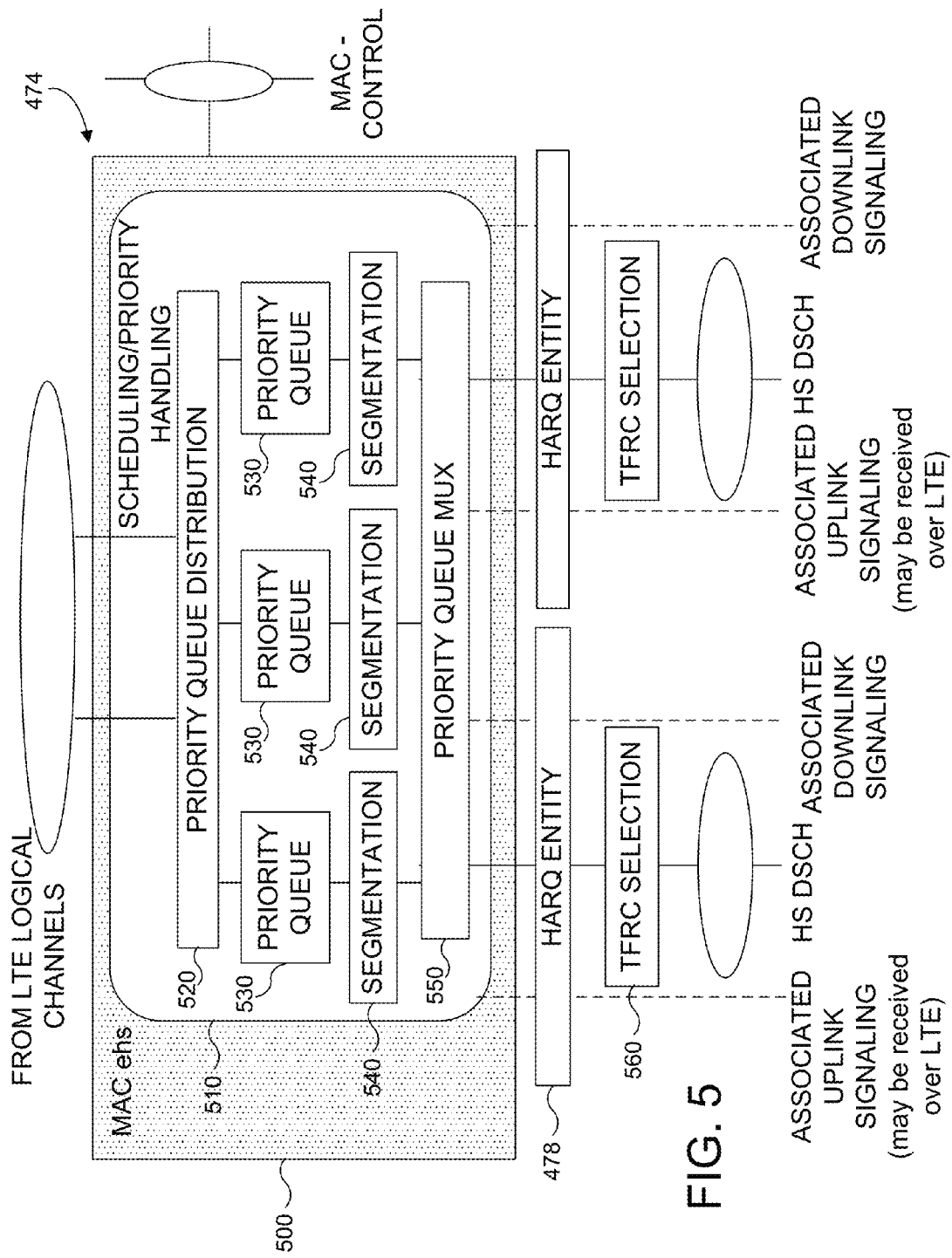
FIG. 5 is a diagram illustrating a representative medium access control (MAC)-ehs entity on an evolved Node-B (eNB) side.

FIG. 5 is a diagram of a representative MAC-ehs module 500 used in the HSPA MAC 474 of FIG. 4.

Referring to FIG. 4, the L2 structure 400 may be for an eNB side implementation such that an eNB scheduler, (e.g., aggregation scheduling and priority handling), in the MAC may determine whether to route the data to an LTE MAC 464 or an HSPA MAC 474. The LTE MAC 464 and HSPA MAC 474 are shown as not including the handling unit 462 for simplicity. The LTE MAC 464 and HSPA MAC 474, each may include portions of the handling unit 462. The L2 structure may include a plurality of sublayers, for example, a Packet Data Convergence Protocol (PDCP) layer 440, an RLC layer 450 and/or an aggregated MAC layer 460, among others, for example, for the DL. As shown in FIG. 4, the PDCP layer 440 may include Robust Header Compression (ROHC) processing at ROHC entity 442 and security processing at security entity 444 and the data may be provided to the RLC layer 450. The RLC layer 450 may include a segmentation and Automatic Repeat Request (ARQ) entity 452. For example, the radio bearers 402 may be processed via the PDCP layer 440 and the RLC layer 450 to generate logical channels or channel traffic 404, which may be provided to MAC layer 460.

The MAC layer 460 may provide aggregation, scheduling and priority handling of the multiple logical channels 404 via the handling unit 462 (e.g., common to and shared by the HSPA and LTE MACs), and multiplexing the scheduled traffic from the logical channels 404 into DL-SCH data units via the LTE MAC 464 or DL HS DSCH data units via the HSPA MAC 474 that may be transmitted over the air by the physical layer. The LTE MAC 464 may include a LTE scheduler 466, a multiplexer 468 and Hybrid Automatic Repeat Request (HARQ) entities 470. The HSPA MAC 474 may include HSPA MAC-ehs 476 and HARQ entities 478.

The HSPA MAC 474 may correspond to a MAC-ehs entity, which may include at least one MAC-ehs module 500, as shown in FIG. 5. The MAC-ehs module 500 may include a scheduling/priority handling unit 510, a priority queue distribution 520, a plurality of priority queues 530, a plurality of segmentation units 540 and a priority queue multiplexer (PQMUX) 550. The MAC ehs module 500 may provide the data to the HARQ entity 478. For example, the scheduling/priority handling unit 510 which may provide or perform the scheduling/priority handling functions may manage HS-DSCH resources between HARQ entities 478 and data flows according to their priority class. The PQMUX 550 may determine the number of octets to be included in a MAC-ehs PDU from each priority queue based on the scheduling decision and available transport format and resource combination (TFRC) for this function, the segmentation unit 540 may perform segmentation of MAC-ehs service data units (SDUs) and the TFRC selection unit 560 may select an appropriate transport format and resource for the data to be transmitted on the HS-DSCH. The MAC-ehs entity may also provide associated UL and/or DL signaling.

Certain representative procedures may allow reception of data over multiple RATs on the WTRU 102 side. If LTE is the primary RAT, in addition to the LTE protocol stack, (e.g., physical layer, MAC, RLC, PDCP, RRC), at least the following HSPA configuration may be provided to the WTRU 102: (1) a MAC-ehs entity and the applicable configuration parameters or the HS-DSCH physical channel resources and configuration parameters. The WTRU 102 may be configured to start receiving HS-SCCH and HS-DPSCH on the secondary RAT (e.g., the HSPA RAT). The data received over the HS-DPSCH may be processed by the MAC-ehs entity (e.g., the HSPA), the HARQ entity 478 and associated HSPA MAC functionalities, and data received over the DL-DSCH may be processed by the LTE HARQ processes and de-multiplexed according to the LTE MAC protocol headers.

Figure 6:
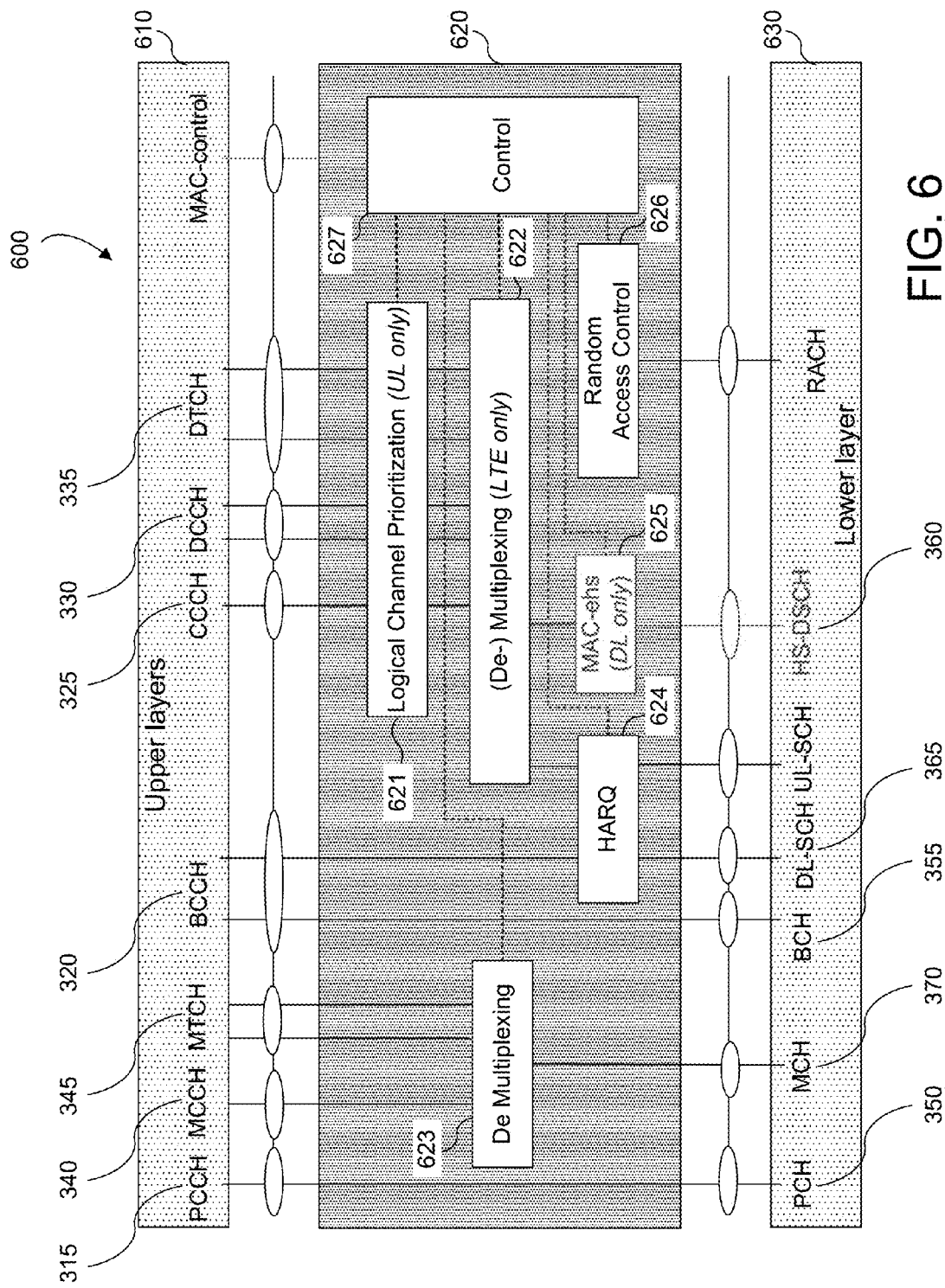
FIG. 6 is a diagram illustrating a representative MAC architecture.
Figure 7:
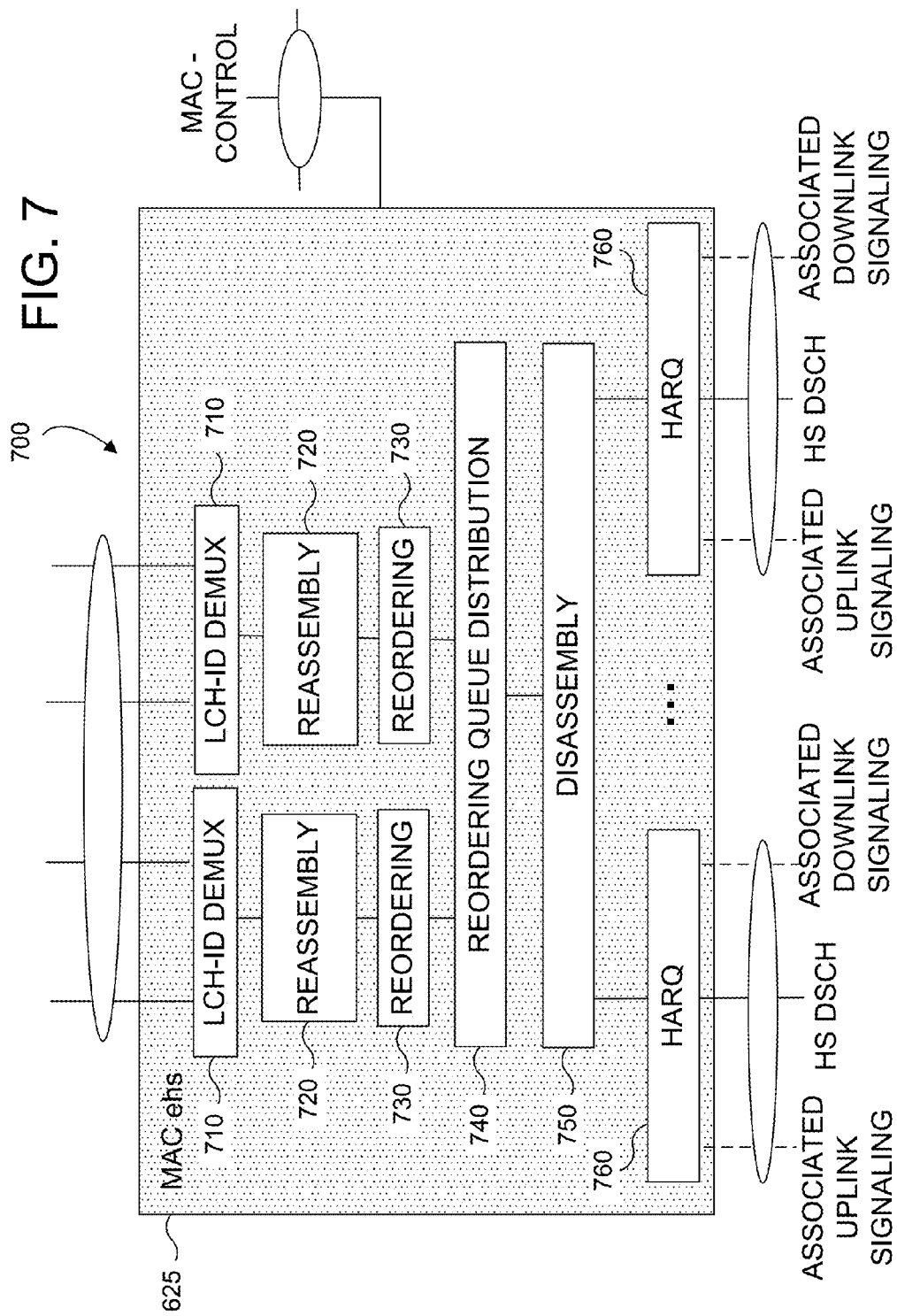
FIG. 7 is a diagram illustrating a representative MAC-ehs entity on a WTRU side.

FIG. 6 is a diagram illustrating a representative implementation of a WTRU MAC architecture 600. FIG. 7 is a diagram of a representative MAC-ehs module 700 used in the MAC architecture 600.

Referring to FIG. 6, the WTRU MAC architecture 600 may be exchange data with upper layers 610 and a lower layer 630. The upper layers 610 may correspond to the DL logical channels of FIG. 3 and may include MAC control. The lower layer 630 may correspond to the DL transport channels of FIG. 3 and may include an UL-SCH. The MAC layer 620 may include a logical channel prioritization 621 (e.g., for the UL only), a multiplexer/demultplexer 622 (e.g., for LTE only), a demultiplexer 623, a HARQ entity 624, a MAC-ehs entity 625 (e.g., for DL only), random access control 626 and a control 627 for managing or controlling other functions, modules and/or entities of the MAC layer 620. The MAC-ehs entity 625 on the WTRU 102 side may include at least one MAC-ehs, for example, as shown in FIG. 7.

For example: (1) the PCCH 315 and PCH 350 may be coupled such that data exchanged via the MAC layer 620 may not be processed (e.g., may be a pass-through); (2) the MCCH 340 and the MTCH 345 may be coupled via a demultiplexer 623 to the MCH 370; (3) the BCCH 320 and the BCH 355 may be coupled such that data exchanged via the MAC layer 620 may not be processed (e.g., may be a pass-through); the BCCH 320 may also be coupled via HARQ entity 624 to the DL-SCH 365 (e.g., or UL-SCH) for data exchange; (4) the CCCH 325, the DCCH 330 and the DTCH 335 may be coupled via the logical channel prioritization 621 (e.g., for the UL only), the multiplexer/demultplexer 622 (e.g., for LTE only), and the HARQ entity 624 to the DL-SCH 365 (e.g., or UL-SCH) for data exchange; and/or (5) the CCCH 325, the DCCH 330 and the DTCH 335 may be coupled via the logical channel prioritization 621 (e.g., for the UL only), the multiplexer/demultplexer 622 and the MAC-ehs entity 625 (e.g., for DL only) to the HS-DSCH 360 for data exchange.

Referring to FIG. 7, the MAC ehs 700 on the WTRU 102 side may include a plurality of LCH-ID demultiplexing entities 710, a plurality of reassembly entity 720, a plurality of reordering entities 730, a reordering queue distribution function 740, a disassembly entity 750 and a plurality of HARQ entities 760. The HARQ entities 760 may handle tasks used for hybrid ARQ including generating ACKs or NACKs. The disassembly entities 750 may disassemble the MAC-ehs PDUs by removing the MAC-ehs header and/or padding. The reordering queue distribution function 740 may route the received reordering PDUs to reordering queues based on the received logical channel identifier. The reordering entities 730 may organize received reordering PDUs according to the received Transmission Sequence Number (TSN). Data blocks with consecutive TSNs may be delivered to reassembly entity upon reception. The reassembly entities 720 may reassemble segmented MAC-ehs SDUs and may forward the MAC PDUs to LCH-ID demultiplexing entities 710. The LCH-ID demultiplexing entities 710 may route the MAC-ehs SDUs to one or more logical channels based on the received logical channel identifier.

For example, the MAC ehs 625 may include disassembly of the MAC-ehs PDUs according to the MAC-ehs protocol headers, the reordering queue distribution functions, reordering and reassembly functions. The LCH-ID de-multiplexing may be present in the MAC-ehs 625, which may enable the LTE de-multiplexing function 622 in FIG. 6 to be bypassed.

In certain representative embodiments, the LCH-ID de-multiplexing functionality may be removed from the MAC-ehs and the LTE de-multiplexing function may be in charge of routing the data to the correct logical channel.

The reordering functionality in the MAC (e.g., the MAC-ehs 625) may cause additional delays in the generation of RLC ACK/NACK status reports and may be due to a timer being present in the RLC protocol to ensure that packets (e.g., all packets) that may be delayed due to HARQ retransmissions have been received prior to transmitting the RLC status report.

Since the MAC-ehs 625 may deliver data in order, (e.g., after accounting for HARQ delays), the timers in the RLC may duplicate (e.g., unnecessarily duplicate) the delay. In certain representative embodiments, to reduce such delays, various representative procedures are described below.

In a first representative procedure, a T1 timer in the MAC-ehs 625 may be set to one of a plurality of times (e.g., to 10 ms, or to 0 ms). This may move the reordering (e.g., all of the reordering) in the RLC.

In a second representative procedure, the RLC may not start a timer if the missing sequence numbers are determined to be from the UTRA MAC-ehs. Certain representative procedures may be used to determine over which interface the missing data was transmitted based on an interaction between the MAC-ehs 625 and the RLC.

If the MAC-ehs 625 is co-located with the LTE RLC, the MAC-ehs functionality may be modified, enhanced and/or simplified when LTE aggregation is configured, for example, by taking advantage of the efficiency and optimizations introduced by the upper LTE protocol stack. When the RLC and the MAC-ehs 625 are collocated in the same node, a buffering queue may not be used in the MAC-ehs 625. Since the RLC can performs re-segmentation of RLC PDUs to ensure that the PDU may fit into the MAC TB, it is contemplated to remove (or disable) the segmentation functionality from the HSPA MAC. To reduce the delays in the RLC due to TSN number and reordering in the WTRU 102, it is contemplated that TSN numbering and reordering are not each performed by the MAC.

As an example implementation, a LTE aggregated MAC-ehs in a Node B may not perform the following functionalities: (1) TSN numbering; (2) segmentation; and/or (3) queue distribution. The functionality or operation of the LTE aggregated MAC-ehs may include one or more of the following: (1) a scheduling/priority handling functionality or operation, which may manage HS-DSCH resources between HARQ entities and data flows according to the priority of logical channels; (2) TFRC selection, which may perform selection of an appropriate transport format and resource for the data to be transmitted on HS-DSCH; and/or (3) priority handling and multiplexing of data from different logical channels. When data is multiplexed and the MAC PDU is created for the UTRA HS-DSCH, the eNB may use the UTRA MAC-ehs header format.

An LTE aggregated HSPA MAC in the WTRU 102 may be configured to receive and de-multiplex MAC PDUs received over the HS-DPSCH. The data may be received from the physical layer processes in the HARQ, after which the WTRU 102 may perform de-assembly or de-multiplexing of the HSPA MAC PDUs and may forward them to the correct logical channel, according to the LCH-ID. The enhanced HSPA MAC may not perform reordering queue distribution, reordering or re-assembly.

In certain representative embodiments, a common MAC header format for the MAC PDU may be created to be transmitted over the UTRAN. The MAC header format may correspond to the LTE header format such that MAC-PDU created may include or may contain a LTE format and may be transmitted over the HS-DPSCH or an E-DPDCH channel. The HARQ transmission and the TFRC (or the E-TFC) selection may be performed according to the UTRAN protocol (e.g., with the MAC header being a LTE MAC header).

Figure 8:
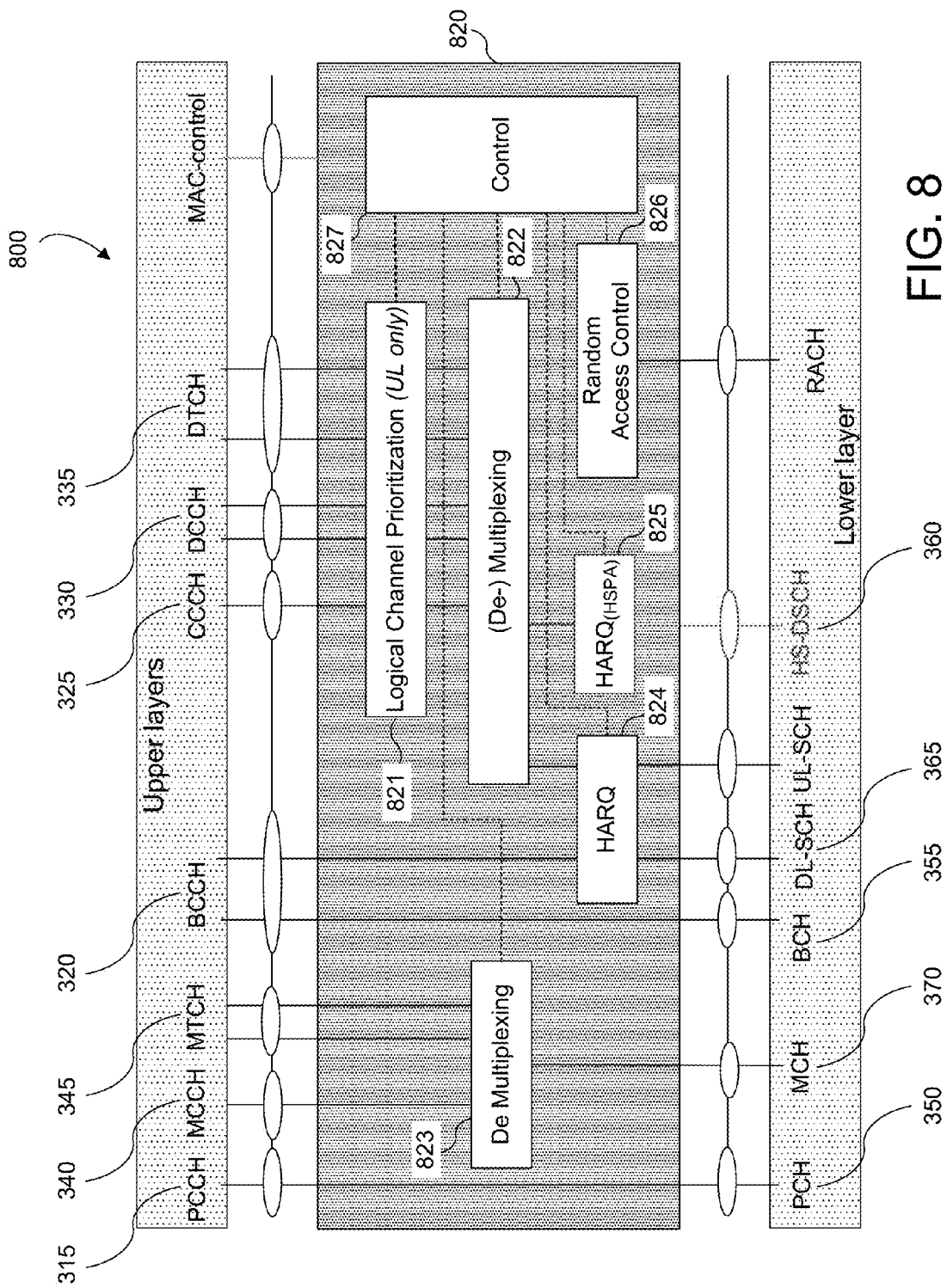
FIG. 8 is a diagram illustrating a representative MAC architecture using multi-RAT aggregation and a common long term evolution (LTE) MAC header format.

On the WTRU 102 side, the functionalities of the MAC-ehs may no longer be used and MAC-ehs may remain transparent. The WTRU 102 may receive data over the HS-DPSCH and may use the UTRAN HARQ process characteristics. Once the data is properly processed and successfully received, it may be passed to the LTE de-multiplexing entity that may process the data as if it was received over an LTE physical channel. An example MAC structure 820 is shown in FIG. 8. The MAC structure 820 is similar to that of the MAC structure 620 except that the multiplexer/demultplexer 822 may or may not be used for LTE only and an HARQ HSPA entity 825 may be used in lieu of the MAC ehs entity 625 in FIG. 6.

The MAC layer 820 may include a logical channel prioritization 821 (e.g., for the UL only), a multiplexer/demultplexer 822, a demultiplexer 823, a HARQ entity 824, a HARQ HSPA entity 825, random access control 826 and a control 827 for managing or controlling other functions, modules and/or entities of the MAC layer 820.

For example, (1) the PCCH 315 and PCH 350 may be coupled such that data exchanged via the MAC layer 820 may not be processed (e.g., may be a pass-through); (2) the MCCH 340 and the MTCH 345 may be coupled via a demultiplexer 623 to the MCH 370; (3) the BCCH 320 and the BCH 355 may be coupled such that data exchanged via the MAC layer 820 may not be processed (e.g., may be a pass-through); the BCCH 320 may also be coupled via HARQ entity 824 to the DL-SCH 365 (e.g., or UL-SCH) for data exchange; (4) the CCCH 325, the DCCH 330 and the DTCH 335 may be coupled via the logical channel prioritization 821 (e.g., for the UL only), the multiplexer/demultplexer 822 (e.g., for LTE only), and the HARQ entity 824 to the DL-SCH 365 (e.g., or UL-SCH) for data exchange; and/or (5) the CCCH 325, the DCCH 330 and the DTCH 335 may be coupled via the logical channel prioritization 821 (e.g., for the UL only), the multiplexer/demultplexer 822 and the HARQ HSPA entity 825 to the HS-DSCH 360 for data exchange.

It is understood by one of skill in the art that the concepts described herein are also applicable to UL E-DCH aggregation, wherein the MAC-i/is is the equivalent UL UTRA MAC entity. For example, similar to the DL, for UL E-DCH, it is contemplated to optimize the functionality of the MAC-i/is, but performing only E-TFC selection and multiplexing of data in the selected MAC PDU. The segmentation and TSN numbering functionality may be removed. The LTE MAC PDU header format may also be used for the UTRA UL MAC PDU, similar to the UL.

To allow the aggregation of a plurality of (e.g., two or more) RATs at the MAC and physical layer, the RRC common control layer may properly control and configure the WTRU 102 to operate with the HSPA MAC-ehs and DL HS-DSPCH. This may be achieved by extending the LTE control plane to incorporate the HSPA MAC and/or physical layer configuration in RRC messages. The RRC messages may include: (1) RRC Connection Reconfiguration messages; (2) RRC Connection Reestablishment messages; and/or (3) RRC Connection Setup messages, among others.

The configuration may be included in the message or within an IE in the message such as IE "RadioResourceConfigDedicated" and/or "PhysicalConfigDedicated" that may include the HSPA physical channel configuration parameters. For the DL physical channel configuration, the LTE RRC messages may include a UTRA-DLSecondaryCell-Container. The container may correspond to a container including IEs encoded according an UTRA RRC specification. For the DL, the IE may correspond to IE "DL secondary cell info". In certain representative embodiments, IE reception handling from another RAT may be implemented.

If full MAC-ehs functionality is to be configured, an UTRA-MAC-ehsConfig-Container may be used in the above-mentioned RRC messages. This container may refer to the UTRA IE "Added or reconfigured MAC-ehs reordering queue".

The MAC-ehs reordering queues may have an explicit mapping with the LTE logical channels. It is contemplated to use the LTE IE "DRB-to-ADDMod" and/or IE"SRB-to-ADDMod" to include the mapping of the logical channel identity to one of the MAC-ehs queue identity, (e.g., the MAC-ehs queue ID may be added to the IE).

To maintain the LTE IEs (e.g., not modify the LTE IEs), it is contemplated to include this information in the IE "added or reconfigured MAC-ehs reordering queue". The new information may include, for each MAC-ehs reordering queue, the LTE logical channel identity that is mapped to the MAC-ehs queue. Similar to the physical channel configuration parameters, specific actions may be implemented to handle the reception of this IE from another RAT.

It is understood by one of skill in the art that even though this example is provided for the MAC and physical channel configuration, they may be equally applicable to other information, such as UL physical channel configuration, RLC, and the like.

The UTRA-container may include all or a portion of the above-mentioned IEs in one message or may use separate containers for each of these IEs.

In certain representative embodiments, procedures may be implemented to allow multi-RAT aggregation in the MAC sub-layer, with HSPA acting as the primary RAT. The HSPA RLC, PDCP, RRC, and NAS entities may be established, and for a multi-RAT configured WTRU 102, two MAC entities may be established (e.g., a HSPA MAC and a LTE MAC) and the corresponding physical channels. The representative embodiments of FIGS. 3-8 described above regarding the mapping of the logical channels and transport channels are equally applicable for these embodiments.

In certain representative embodiments, independent MAC entities (e.g., two or more independent MAC entities) may be configured and setup (for example, an HSPA MAC, (e.g., a MAC-ehs or a MAC-i/is), and a LTE MAC). The data from a logical channel may be sent over a HSPA MAC and/or a LTE MAC. The data may be processed independently from each MAC entity, assembled and transmitted according to functionalities of each RAT.

In certain representative embodiments, the HSPA RLC protocol may rely on the MAC to perform segmentation of RLC PDUs that may not fit into the selected transport block size (e.g., which the LTE MAC may not support). The RLC PDUs that do not fit into the selected or requested transport block (TB) may not be included in the MAC PDU, and these RLC PDUs may be transmitted either over the HSPA MAC or in a subsequent TTI.

In certain representative embodiments, the TB size to be transmitted over both RATs may be independently selected by each RAT. The HSPA MAC may assemble and construct the MAC PDU that may be transmitted over either HSPA or LTE physical channels and HARQ processes. This may allow the HSPA MAC to perform additional operations such as segmentation of RLC PDUs and/or TSN numbering per logical channel. The MAC header applied to the MAC PDUs may correspond to that of the HSPA MAC header and the MAC PDU created to be transmitted over LTE may be passed to the LTE HARQ and may be sent over the LTE physical channels. On the receiving side, the data received over the LTE and HSPA physical channels may be processed and combined in the corresponding HARQ processes of LTE and HSPA, respectively. After a TB is successfully decoded from any of the RATs, the HARQ process may forward the data to the HSPA MAC entity that may de-multiplex, reorder, reassemble and forward to the corresponding logical channel.

In certain representative embodiments, the TSN and SI fields may be added to each PDU created for each logical channel and the created PDU may be multiplexed and processed by the different MAC entities. As an example, in the UL (or DL), a MAC-is PDU (or MAC-ehs reordering PDU) may be forwarded to one of: (1) a MAC-i entity (or MAC-ehs multiplexing function); or (2) an LTE MAC entity such that additional MAC headers may be added and the HSPA MAC PDU or the LTE MAC PDU, respectively, may be created. On the receiving side, the data received from each RAT may be processed and de-multiplexed by the corresponding LTE or HSPA MAC entity and may be forwarded and processed by the HSPA function that may reorder and reassemble the data and route them to the correct logical channel.

In certain representative embodiments, procedures may be implemented for allowing the transmission of UCI pertaining to HSPA signals, (hereinafter referred to as "HSPA UCI"), from at least one carrier over at least one LTE UL physical channel such as the physical UL control channel (PUCCH) or the physical UL shared channel (PUSCH). Unless otherwise specified, the following representative procedures may apply to transmission over any of these channels, which are collectively referred to as the "LTE UL physical channel" (or PUxCH). The PUxCH may include: (1) an HSPA signal, which may generally refer to: (i) a transmission over the HS-SCCH channel and/or the HS-PDSCH (at the physical layer) and/or (ii) a transmission over the HS-DSCH transport channel; and/or (2) the HSPA UCI, which may include at least (i) ACK/NACK to DL control information (such as HS-SCCH orders), (ii) HARQ ACK/NACK, (iii) Channel state information, (iv) Pre-coding Information, and/or (v) Rank Information, among others.

If the transmission time interval (TTI) of the HS-DSCH is (e.g., is 2 ms) and the subframe duration of either PUCCH or PUSCH is (e.g., 1 ms), the following representative embodiments may provide timing relationships between reception of HSPA signals from a DL CC and transmission of corresponding UCI over an LTE physical channel.

In certain representative embodiments, the HSPA UCI corresponding to a specific HSPA signal may be transmitted on the PUxCH over a single LTE subframe (e.g., of 1 ms). Such transmission may occur in subframe N+k, where k is a parameter of either fixed value or a value provided by higher layers, and N is the reference subframe of the HSPA signal in the LTE subframe numbering. For example, the reference subframe N may correspond to at least one of: (1) the subframe during which (or at the start of which) the HS-SCCH transmission starts; (2) the subframe during which (or at the start of which) the HS-PDSCH transmission starts; or (3) the subframe during which (or at the start of which) the HS-DSCH transmission starts.

In certain representative embodiments, the HSPA UCI corresponding to a specific HSPA signal may be transmitted on the PUxCH over two LTE subframes (e.g., of 1 ms). Such transmission may occur in subframes N+k and N+k+1. It is contemplated that similar timing may be applied to: (1) UL transmission on PUSCH for cross-carrier scheduling used across serving cells of different RATs and/or for WTRU 102 operations such as activation/deactivation of serving cells, among others.

With respect to the selection of a specific PUCCH or PUSCH for transmission of the HSPA UCI, the following representative procedures may be employed including: (1) the HSPA UCI may be transmitted (e.g., always transmitted) on the PUCCH, (e.g., if (e.g., only if) the possibility of simultaneous PUCCH and PUSCH transmission is configured by higher layers; (2) the HSPA UCI may be transmitted over the same single physical channel and same UL CC as the LTE UCI, according to rules applicable to the selection of physical UL channel for the transmission of LTE UCI; and/or (3) a first part of the HSPA UCI may be transmitted in a first PUxCH and a second part of the HSPA UCI may be transmitted in a second PUxCH, among others. For instance, the HARQ A/N part of HSPA UCI may be transmitted on the PUCCH and the CSI part of the HSPA UCI may be transmitted on the PUSCH.

The following representative embodiments may be applicable for the transmission of HSPA UCI over PUCCH.

The expression "corresponding PDCCH/PDSCH transmission" generally refers to a PDCCH/PDSCH transmission for which the corresponding UCI (e.g., HARQ A/N) may be transmitted in the concerned subframe. Similarly, the expression "corresponding HS-SCCH transmission" generally refers to a HS-SCCH transmission for which the corresponding UCI (A/N or HARQ A/N) may be transmitted in the concerned subframe.

The PUCCH resource used to transmit the HSPA UCI and/or the LTE UCI may be obtained according to at least one of the following procedures including:

(1) a PUCCH resource index may be received from the corresponding HS-SCCH transmission (e.g., if (e.g., only if) no corresponding PDSCH transmission (or no corresponding PDSCH transmission for a secondary LTE serving cell) is received);

(2) the PUCCH resource index may be received from the PDCCH of a corresponding LTE transmission (e.g., if (e.g., only if) a corresponding PDSCH transmission for a secondary LTE serving cell is received);

(In certain representative embodiments, if a corresponding PDSCH transmission does not exist, the resource index may be obtained from a PDCCH encoded with a format (e.g., specific format) indicating the transmission of one or more HSPA signals from one or more HSPA DL CCs.)

(3) the PUCCH resource index may be provided by higher layers (e.g., when (e.g., only when) no resource index may be signaled from either a PDCCH or HS-SCCH transmission;

(4) the PUCCH resource to use is the same as the PUCCH resource used in an immediately preceding subframe, (e.g., where the HSPA UCI is transmitted over two subframes (e.g., N+k and N+k+1)).

In certain representative embodiments, procedures may be implemented for allowing the transmission of UCI pertaining to LTE signals (hereinafter referred to as "LTE UCI") from at least one carrier over at least one HSPA UL physical channel such as the HS-DPCCH, the E-DPCCH and/or the dedicated physical control channel (DPCCH). Unless otherwise specified the following procedures may apply to transmission over any of these channels, which may be collectively referred to as "HSPA UL physical channel" (or HS-DPxCH) in the following.

A LTE signal generally refers to a transmission over the PDCCH channel and/or the PDSCH channel (at the physical layer) or a transmission over the DL-SCH transport channel.

If the transmission time interval (TTI) of the DL-SCH in LTE is (e.g., 1 ms), and the subframe duration of a HSPA UL physical channel such as the HS-DPCCH is (e.g., 2 ms), the following representative embodiments may describe or identify the timing relationships between reception of LTE signals from a DL CC and transmission of corresponding UCI over an HSPA UL physical channel including the LTE UCI corresponding to LTE signals from two consecutive LTE subframes (e.g., of 1 ms) that may be transmitted in a single subframe (e.g., 2 ms subframe) of the HS-DPCCH. For example, the LTE UCI transmitted in subframe N (in the HSPA UL subframe numbering) may correspond to LTE signals that have been transmitted at the start or during subframe N-k and N-k+1, where k is a parameter of either fixed value or a value provided by higher layers. Similar timing may also be applied to UL transmission on HSPA for cross-carrier scheduling across serving cells of different RATs, and/or WTRU 102 operations such as activation/deactivation of serving cells.

If the capacity of a HS-DPCCH channel for the transmission of LTE UCI, for example, along with the transmission of HSPA UCI is limited, bundling of ACKs or NACKs (A/N) (e.g., AND operation over multiple A/N) corresponding to different transport blocks) may be applied to the LTE UCI prior to inclusion in the HSPA physical channel. For example, the following procedures may be utilized alone or in combination including (1) bundling of A/N of two consecutive LTE subframes; (2) bundling of A/N in the spatial domain; and/or (3) bundling of A/N corresponding to transport blocks transmitted in a combination of LTE DL CC's and/or HSPA DL CC's, among others.

In certain representative embodiments, procedures may be implemented relating to WTRU 102 concurrently operating on a plurality of CCs using at least one CC on which the WTRU 102 operates according to a first RAT and at least one CC on which the WTRU 102 operates according to a second RAT.

The WTRU 102 may separately access a plurality of RATs, each using a different radio resource connection (e.g., control plane). For example, the WTRU 102 may use a first RAT that may be LTE and a second RAT that may be WCDMA and/or HSDPA (and/or HSUPA). The WTRU 102 may establish one independent connection to each RAT. From a network connectivity perspective, the WTRU 102 may be viewed as a single device implementing two different network interfaces (e.g., IP network interfaces), each with its own PDP context, (e.g., IP address), control/user data paths, and security context. RRM, mobility management, scheduling, and/or admission control may be independent from one another.

FIG. 9 is a flowchart illustrating a representative method 900 for managing carrier aggregation for a multi-RAT WTRU 102.

Referring to FIG. 9, the representative method 900 may include, at block 910, the WTRU 102 receiving over a primary channel associated with a RAT of a first type, provisioning information for provisioning a supplementary channel associated with a RAT of a second type. At block 920, the WTRU 102 may establish the supplementary channel associated with the RAT of the second type based on the received provisioning information. At block 930, the WTRU 102 may wirelessly exchange first data associated with a communication over the primary channel via the RAT of the first type, while wireless exchanging second data associated with the communication over the supplementary channel via the RAT of the second type.

Exchanging generally refers to the sending or receiving of data or information from one device or entity to another device or entity. Such an exchange may be one directional (e.g., from a first device to a second device or may be two directional (e.g., between devices such in a response with an acknowledgement).

The terms "while", "simultaneous", and "concurrent" generally refer to; (1) a first condition or a first event occurring contemporaneously with a second condition or second event; or (2) that a channel associated with the first condition or the first event and a channel associated with the second condition or the second event are contemporaneously on or active. For example, these terms may include the direct physical transmission of signals at the same time, or interleaved bursts of data on separate RATs without interrupting the communications of the either RAT (e.g., maintaining connectivity of the RAT simultaneously).

In certain representative embodiments, the WTRU may be a UE, or a terminal device for use by an end user, for example, as a cell phone, smart phone, a tablet, and/or netbook, among others. Alternatively, the WTRU may be other components of the radio access network including a network access point, a base station, an eNB, and/or a HeNB, among others.

In certain representative embodiments, the wirelessly exchanging of the second data over the established supplementary channel may include one of: (1) wirelessly sending the second data over the established supplementary channel; (2) wirelessly receiving the second data over the established supplementary channel or (3) wirelessly sending and receiving different portions of the second data over the established supplementary channel.

In certain representative embodiments, the wirelessly receiving provisioning information may include receiving via the primary channel associated with the RAT of the first type control information for the primary channel and control information for the supplementary channel.

In certain representative embodiments, the first type of RAT may be one of: (1) a wideband code division multiple access (WCDMA) RAT; (2) a high speed packet access (HSPA) RAT; (3) a high speed downlink packet access (HSDPA) RAT; (4) a high speed uplink packet access (HSUPA) RAT; or (5) a long term evolution (LTE) RAT.

In certain representative embodiments, the second type of RAT may be a different one (e.g., different type) of RAT such as: (1) the WCDMA RAT; (2) the HSPA RAT; (3) the HSDPA RAT; (4) the HSUPA RAT; (5) a LTE RAT; (6) a non-cellular RAT; or (7) a WiFi RAT.

In certain representative embodiments, the establishing of the supplementary channel associated with the RAT of the second type may include determining, from the received provisioning information, one or more carrier components associated with the RAT of the second type to be provisioned for wirelessly exchanging the second data over the supplementary channel; and provisioning the supplementary channel using the determined one or more carrier components.

In certain representative embodiments, the representative method may include prior to receiving by the WRTU 102 the provisioning information, establishing the primary channel associated with the RAT of the first type.

In certain representative embodiments, the establishing of the supplementary channel associated with the RAT of the second type may include establishing the supplementary channel using a single radio resource connection to control radio resources of the RATs of the first and second types.

In certain representative embodiments, the establishing of the single radio resource connection may include setting up a radio resource control (RRC) connection.

In certain representative embodiments, the method may include prior to receiving by the WRTU the provisioning information, establishing the primary channel associated with the RAT of the first type.

In certain representative embodiments, the establishing of the supplementary channel associated with the RAT of the second type may include establishing one or more supplementary channels using at least one respective radio resource connection for each of a plurality of different RAT types to control radio resources associated with the primary and one or more supplementary channels supported concurrently by the WTRU 102.

In certain representative embodiments, the method may include maintaining the established radio resource connections that may be applicable to different sets of one or more carrier components.

In certain representative embodiments, the wirelessly exchanging of the first data over the primary channel via the RAT of the first type, while wireless exchanging second data over the supplementary channel via the RAT of the second type may include exchanging respective portions of the first and second data of the communication over different ones of the established radio resource via the different sets of carrier components.

In certain representative embodiments, the exchanging of the first data and the second data may include operating the WTRU 102 at a first frequency or in a first frequency band for exchange of the first data and at a second frequency or in a second frequency band that is the same as or different from the first frequency or the first frequency band.

FIG. 10 is a flowchart illustrating a representative method 1000 for performing wireless communications using a multi-mode WTRU 102 that may be configured for simultaneous or near-simultaneous operation on component carriers (CCs) associated with a plurality of radio access technologies (RATs).

Referring to FIG. 10, the representative method 1000 may include, at block 1010, configuring, in the WTRU 102, a high speed packet access (HSPA) medium access control (MAC) entity and a long term evolution (LTE) MAC entity. At block 1020, a plurality of channels may be configured that may be associated with the HSPA and LTE MAC entities.

In certain representative embodiments, the configuring of the HSPA MAC entity and the LTE MAC entity may include integrating the HSPA MAC and the LTE MAC to aggregate data exchanged via HSPA and LTE RATs.

Figure 11:
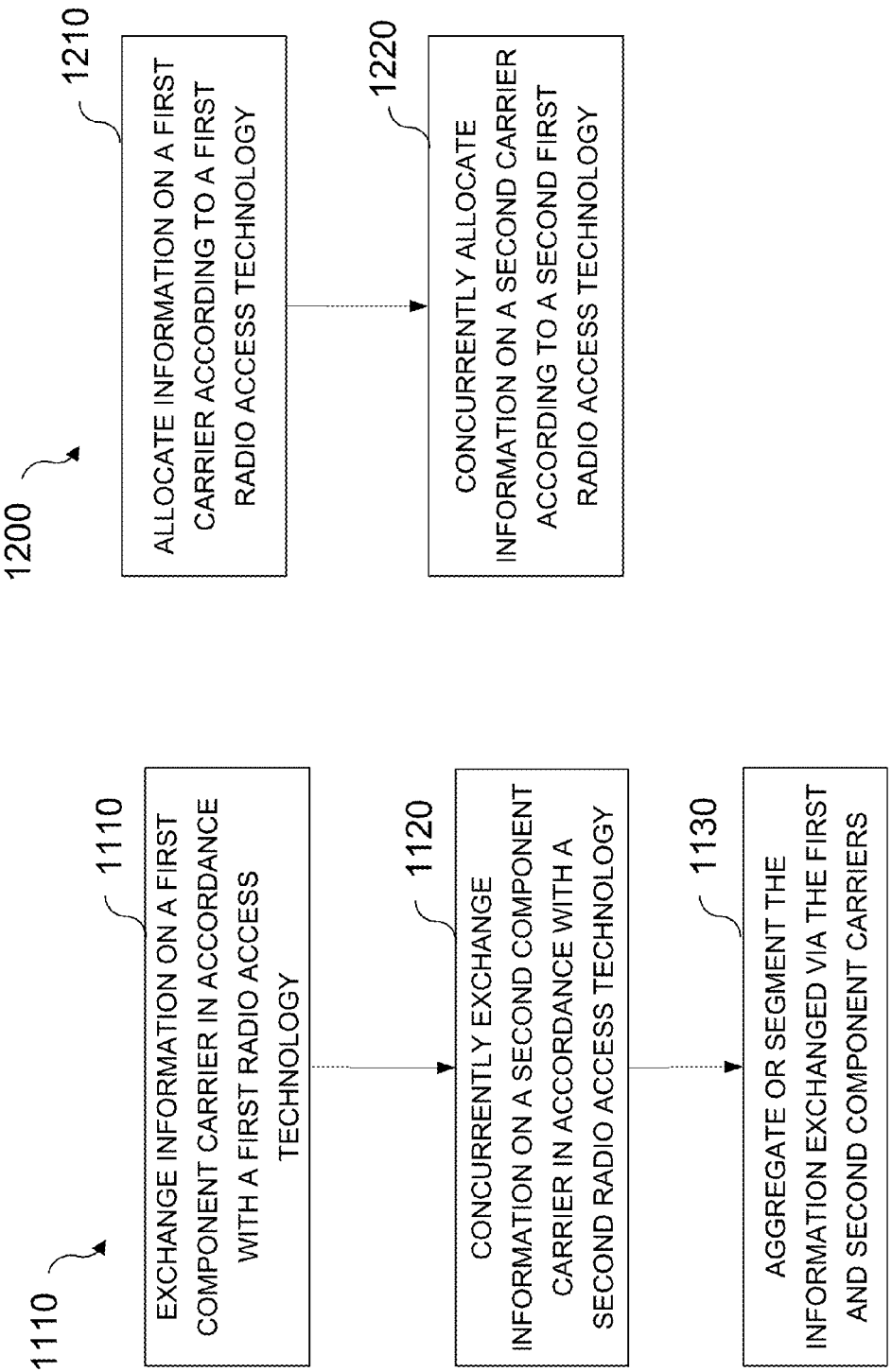
FIG. 11 is a flowchart illustrating another representative method for performing wireless communications using a multi-mode WTRU.

FIG. 11 is a flowchart illustrating another representative method 1100 for performing wireless communications using a multi-mode WTRU 102 that may be configured to for concurrent operation on component carriers (CCs) associated with a plurality of radio access technologies (RATs).

Referring to FIG. 11, the representative method 1100 may include, at block 1110, information exchanged on a first CC in accordance with a first RAT. At block 1120, information may be concurrently exchanged on a second CC in accordance with a second RAT. At block 1130, the information exchanged may be aggregated or segmented via the first and second CCs.

In certain representative embodiments, the representative method may include configuring one of: (1) a single radio resource connection to maintain the exchange of the information on the first and second CCs; (2) a radio resource connection for each CC used to maintain the exchange of the information on the first and second CCs; or (3) a radio resource connection for each RAT used to maintain the exchange of the information on the first and second CCs.

In certain representative embodiments, the representative method may include the WTRU 102 sending a block acknowledgment associated with the second CC on the first CC to provide a block acknowledgment/non-acknowledgement indication associated with information exchanged on the second CC.

Figure 12:
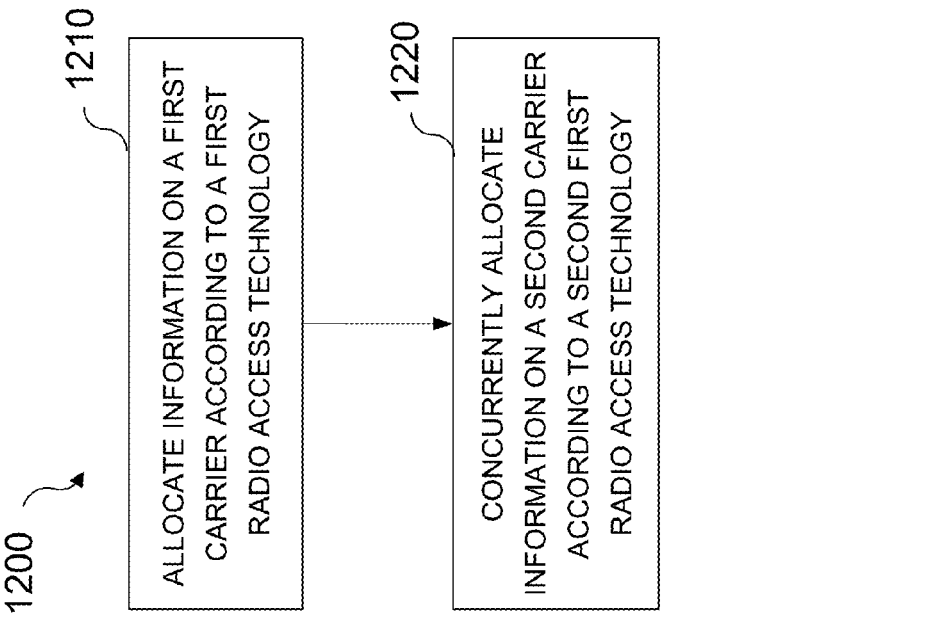
FIG. 12 is a flowchart illustrating a representative method for performing wireless communications in a WTRU supporting multi-RAT carrier aggregation (CA)

FIG. 12 is a flowchart illustrating a representative method 1200 for performing wireless communications in a WTRU 102 supporting multi-RAT carrier aggregation (CA).

Referring to FIG. 12, the representative method 1200 may include, at block 1210, information allocated on a first carrier according to a first RAT. At block 1220, information may be concurrently allocated on a second carrier according to a second RAT.

In certain representative embodiments, the first RAT may be one of: (1) long term evolution (LTE); (2) wideband code division multiple access (WCDMA); (3) high speed packet access (HSPA); (4) high speed downlink packet access (HSDPA) or (5) high speed uplink packet access (HSUPA).

In certain representative embodiments, the second RAT may be a different RAT from the first RAT.

FIG. 13 is a flowchart illustrating a further representative method 1300 for performing wireless communications using a multi-mode WTRU 102 that may be configured for concurrent operation on component carriers (CCs) associated with a plurality of RATs.

Referring to FIG. 13, the representative method 1300 may include, at block 1310, information allocated on a first CC in accordance with a long term evolution (LTE) RAT. At block 1320, information may be concurrently allocated on a second CC in accordance with a different RAT.

In certain representative embodiments, a single radio resource control (RRC) connection may be used to control radio resources of the RATs supported concurrently by the WTRU 102.

In certain representative embodiments, the representative method may include the WTRU 102 concurrently using one radio resource control (RRC) connection for each of the plurality of RATs applicable to different sets of at least one CC.

In certain representative embodiments, the plurality of RATs may operate on the same or different frequencies.

In certain representative embodiments, the representative method may include the WTRU 102 concurrently using one radio resource control (RRC) connection for each of the RATs applicable to different sets of at least one CC.

FIG. 14 is a flowchart illustrating another representative method 1400 for performing wireless communications in a WTRU 102 supporting multi-RAT CA Referring to FIG. 14, the representative method 1400 may include, at block 1410, a first medium access control (MAC) entity configured in the WTRU 102 that may be associated with a first RAT. At block 1420, a second MAC entity may be configured in the WTRU 102 that may be associated with a second RAT. At block 1430 a plurality of channels may be configured that may be associated with the first MAC entity and the second MAC entity.

In certain representative embodiments, the first RAT may be long term evolution (LTE) and the second RAT may be one of: (1) wideband code division multiple access (WCDMA); (2) high speed packet access (HSPA); (3) high speed downlink packet access (HSDPA); (4) high speed uplink packet access (HSUPA); (5) a non-cellular radio access; or (6) a WiFi radio access.

Although features and elements are described above in particular combinations, one of ordinary skill in the art may appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art may appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Embodiments

In one embodiment, a method of managing carrier aggregation for a multi-radio access technology (RAT) wireless transmitter/receiver unit (WTRU) comprises receiving, by the WRTU over a primary channel associated with a RAT of a first type, provisioning information for provisioning a supplementary channel associated with a RAT of a second type; establishing the supplementary channel associated with the RAT of the second type based on the received provisioning information; and wirelessly exchanging, by the WRTU, first data associated with a communication over the primary channel via the RAT of the first type, while wireless exchanging second data associated with the communication over the supplementary channel via the RAT of the second type.

In one embodiments, the wirelessly exchanging of the second data over the established supplementary channel includes one of: (1) wirelessly sending the second data over the established supplementary channel; (2) wirelessly receiving the second data over the established supplementary channel or (3) wirelessly sending and receiving different portions of the second data over the established supplementary channel.

In one embodiment, the wirelessly receiving provisioning information includes receiving via the primary channel associated with the RAT of the first type control information for the primary channel and control information for the supplementary channel.

In one embodiment, the first type of RAT is one of: (1) a wideband code division multiple access (WCDMA) RAT; (2) a high speed packet access (HSPA) RAT; (3) a high speed downlink packet access (HSDPA) RAT; (4) a high speed uplink packet access (HSUPA) RAT; or (5) a long term evolution (LTE) RAT.

In one embodiment, the second type of RAT is a different one of: (1) the WCDMA RAT; (2) the HSPA RAT; (3) the HSDPA RAT; (4) the HSUPA RAT; (5) a LTE RAT; (6) a non-cellular RAT; or (7) a WiFi RAT.

In one embodiment, the establishing of the supplementary channel associated with the RAT of the second type includes: determining, from the received provisioning information, one or more carrier components associated with the RAT of the second type to be provisioned for wirelessly exchanging the second data over the supplementary channel; and provisioning the supplementary channel using the determined one or more carrier components.

In one embodiment, the method includes prior to receiving by the WRTU the provisioning information, establishing the primary channel associated with the RAT of the first type, and the establishing of the supplementary channel associated with the RAT of the second type includes establishing the supplementary channel using a single radio resource connection to control radio resources of the RATs of the first and second types.

In one embodiment, the establishing of the single radio resource connection includes setting up a radio resource control (RRC) connection.

In one embodiment, the method includes prior to receiving by the WRTU the provisioning information, establishing the primary channel associated with the RAT of the first type and the establishing of the supplementary channel associated with the RAT of the second type includes establishing one or more supplementary channels using at least one respective radio resource connection for each of a plurality of different RAT types to control radio resources associated with the primary and one or more supplementary channels supported concurrently by the WTRU.

In one embodiment, the method includes maintaining the established radio resource connections that are applicable to different sets of one or more carrier components such that the wirelessly exchanging of the first data over the primary channel via the RAT of the first type, while wireless exchanging second data over the supplementary channel via the RAT of the second type includes exchanging respective portions of the first and second data of the communication over different ones of the established radio resource via the different sets of carrier components.

In one embodiment, the exchanging of the first data and the second data includes operating the WTRU at a first frequency or in a first frequency band for exchange of the first data and at a second frequency or in a second frequency band that is the same as or different from the first frequency or the first frequency band.

In one embodiment, a method of performing wireless communications using a multi-mode wireless transmit/receive unit (WTRU) that is configured for simultaneous or near-simultaneous operation on component carriers (CCs) associated with a plurality of radio access technologies (RATs) comprises: configuring, in the WTRU, a high speed packet access (HSPA) medium access control (MAC) entity and a long term evolution (LTE) MAC entity; and configuring a plurality of channels associated with the HSPA and LTE MAC entities.

In one embodiment, the configuring of the HSPA MAC entity and the LTE MAC entity includes integrating the HSPA MAC and the LTE MAC to aggregate data exchanged via HSPA and LTE RATs.

In one embodiment, a method of performing wireless communications using a multi-mode wireless transmit/receive unit (WTRU) that is configured to for concurrent operation on component carriers (CCs) associated with a plurality of radio access technologies (RATs) comprises: exchanging information on a first CC in accordance with a first RAT; concurrently exchanging information on a second CC in accordance with a second RAT; and aggregating or segmenting the information exchanged via the first and second CCs.

In one embodiment the method includes configuring one of: (1) a single radio resource connection to maintain the exchange of the information on the first and second CCs; a radio resource connection for each CC used to maintain the exchange of the information on the first and second CCs; or a radio resource connection for each RAT used to maintain the exchange of the information on the first and second CCs.

In one embodiment, the method includes sending, by the WRTU, a block acknowledgment associated with the second CC on the first CC to provide a block acknowledgment/non-acknowledgement indication associated information exchanged on the second CC.

In one embodiment, a method of performing wireless communications in a wireless transmit/receive unit (WTRU) supporting multi-radio access technology (RAT) carrier aggregation (CA) comprises: allocating information on a first carrier according to a first RAT; and concurrently allocating information on a second carrier according to a second RAT.

In one embodiment, the second RAT is a different RAT than the first RAT.

In one embodiment, a method of performing wireless communications using a multi-mode wireless transmit/receive unit (WTRU) that is configured for concurrent operation on component carriers (CCs) associated with a plurality of radio access technologies (RATs) comprises: allocating information on a first CC in accordance with a long term evolution (LTE) RAT; and concurrently allocating information on a second CC in accordance with a different RAT.

In one embodiment, a single radio resource control (RRC) connection is used to control radio resources of the RATs supported concurrently by the WTRU.

In one embodiment, the method includes concurrently using, by the WTRU, one radio resource control (RRC) connection for each of the plurality of RATs applicable to different sets of at least one CC, wherein the plurality of RATs operates on the same or different frequencies.

In one embodiment, a method of performing wireless communications in a wireless transmit/receive unit (WTRU) supporting multi-radio access technology (RAT) carrier aggregation (CA) comprises: configuring a first medium access control (MAC) entity in the WTRU that is associated with a first RAT; configuring a second medium access control (MAC) entity in the WTRU that is associated with a second RAT; and configuring a plurality of channels associated with the first MAC entity and the second MAC entity.

In one embodiment, the first RAT is long term evolution (LTE), and the second RAT is one of: (1) wideband code division multiple access (WCDMA); (2) high speed packet access (HSPA); (3) high speed downlink packet access (HSDPA); (4) high speed uplink packet access (HSUPA); (5) a non-cellular radio access; or (6) a WiFi radio access.

In one embodiment, a wireless transmit/receive unit (WTRU) includes: a transmit/receive unit configured to receive over a primary channel associated with a RAT of a first type, provisioning information for provisioning a supplementary channel associated with a RAT of a second type; and a processor configured to establish the supplementary channel associated with the RAT of the second type based on the received provisioning information such that the transmit/receive unit wirelessly exchanges first data associated with a communication over the primary channel via the RAT of the first type, while wireless exchanging second data associated with the communication over the supplementary channel via the RAT of the second type.

In one embodiment, the transmit/receive unit wirelessly receives, via the primary channel associated with the RAT of the first type, control information for the primary channel and control information for the supplementary channel.

In one embodiment, the transmit/receive unit wirelessly exchanges the first data using one of: (1) a wideband code division multiple access (WCDMA); (2) a high speed packet access (HSPA); (3) a high speed downlink packet access (HSDPA); (4) a high speed uplink packet access (HSUPA); and/or (5) long term evolution; (LTE) access;

In one embodiment, the transmit/receive unit exchanges the second data, during the exchange of the first data, using at least a different one of: (1) the WCDMA; (2) the HSPA; (3) the HSDPA; (4) the HSUPA; (5) the LTE access; (6) a non-cellular access; and/or (7) a WiFi access.

In one embodiment, the processor determines from the received provisioning information one or more carrier components associated with the RAT of the second type to be provisioned for wirelessly exchanging the second data over the supplementary channel; and provisions the supplementary channel using the determined one or more carrier components.

In one embodiment, the processor, prior to receiving the provisioning information, establishes the primary channel associated with a single radio resource connection and, after receiving the provisioning information, establishes the supplementary channel associated with the same single radio resource connection of the primary channel to control radio resources of the RATs of the first and second types.

In one embodiment, the processor, prior to receiving the provisioning information, establishes the primary channel associated with a first radio resource connection and, after receiving the provisioning information, establishes the supplementary channel associated with a second radio resource connection to respectively control radio resources of the RATs of the first and second types.

In one embodiment, the processor operates the WTRU at a first frequency or in a first frequency band for exchange of the first data and at a second frequency or in a second frequency band that is the same or different from the first frequency or the first frequency band.

In one embodiment, a multi-mode wireless transmit/receive unit (WTRU) for performing wireless communications and configured for concurrent operation on component carriers (CCs) associated with a plurality of radio access technologies (RATs), comprises a processor configured for concurrent operation of a high speed packet access (HSPA) medium access control (MAC) entity, a long term evolution (LTE) MAC entity; and a plurality of channels associated with the HSPA and LTE MAC entities such that the HSPA MAC entity and the LTE MAC entity are configured to aggregate data exchanged via HSPA and LTE RATs.

In one embodiment, a multi-mode wireless transmit/receive unit (WTRU) for performing wireless communications and configured to support simultaneous or near-simultaneous operation on component carriers (CCs) associated with a plurality of radio access technologies (RATs), comprises a transmit/receive unit configured to exchange information via a first CC in accordance with a first RAT and to concurrently exchange information via a second CC in accordance with a second RAT; and a processor configured to aggregate or to segment the information exchanged via the first and second CCs.

In one embodiment, the WTRU is one of: (1) an end user terminal; or a network access point.

In one embodiment, a method of managing carrier aggregation for a multi-radio access technology (RAT) wireless transmitter/receiver unit (WTRU) comprises: receiving, by the WRTU over a primary channel associated with a 3GPP RAT, provisioning information for provisioning a supplementary channel associated with a WiFi RAT; establishing the supplementary channel associated with the WiFi RAT based on the received provisioning information; and wirelessly exchanging, by the WRTU, first data associated with a communication over the primary channel via the 3GPP RAT, while wireless exchanging second data associated with the communication over the supplementary channel via the 3GPP RAT.

In one embodiment, the receiving of the provisioning information includes configuring a 3GPP RRC connection via a 3GPP access point and providing parameters for accessing a WiFi network associated with the WiFi RAT.

In one embodiment, the providing of the parameters for accessing the WiFi network include: at least one of: (1) a frequency band of the WiFi network; (2) a specific channel for the WiFi network; (3) an operation mode for the WiFi network, (4) a Serving Set Identifier (SSID) of the WiFi network; (5) a Basic SSID (BSSID) of a WiFi access point associated with the WiFi network; (6) a set of one or more security parameters; or (7) an indication to activate a WiFi transceiver in the WTRU.

In one embodiment, a non-transitory computer readable storage medium stores program code executable by computer for implementing any method.

What is claimed is:

1. A method of managing a multi-radio access technology (multi-RAT) wireless transmitter/receiver unit (WTRU), the method comprising:

configuring, by the WTRU, a primary radio connection of a RAT of a first type associated with a radio resource control (RRC) connection;

receiving, by the WTRU, configuration information to configure a secondary radio connection of a RAT of a second type;

configuring, by the WTRU, the secondary radio connection of the RAT of the second type based on the received configuration information of the RAT of the second type, wherein the primary radio connection and the secondary radio connection are associated with the RRC connection;

receiving, by the WTRU, control information related to the RAT of the second type using the primary radio connection;

determining that a radio link failure has occurred on the RAT of the second type; and transmitting an RRC message using resources of the RAT of the first type based on the determined radio link failure.

2. The method of claim 1, wherein:
the first type of RAT is one of: (1) a wideband code division multiple access (WCDMA) RAT; (2) a high speed packet access (HSPA) RAT; (3) a high speed downlink packet access (HSDPA) RAT; (4) a high speed uplink packet access (HSUPA) RAT; or (5) a long term evolution (LTE) RAT; and
the second type of RAT is different from the first type of RAT.

3. The method of claim 1, further comprising:
configuring a primary channel associated with the RAT of the first type and a supplementary channel associated with the RAT of the second type; and
receiving information over the RRC connection to control radio resources of the RATs of the first and second types.

4. The method of claim 1, further comprising:
transmitting a message based on a RRC protocol of the RAT of the second type only using resources of the RAT of the second type, wherein the message corresponds to a RRC reconfiguration of the RAT of the second type.

5. The method of claim 1, further comprising sending a notification over the primary radio connection on condition that the radio link failure has occurred on the secondary radio connection of the RAT of the second type.

6. The method of claim 1, further comprising:
receiving, on the RAT of the first type, a message requesting the WTRU to perform a random access procedure on the RAT of the second type; and
initiating the random access procedure using resources of the RAT of the second type based on the message received on the RAT of the first type.

7. The method of claim 1, wherein:
the configuration information received via the primary radio connection includes parameters for accessing a network of the second type; and
the parameters include at least one of: a frequency band or a set of one or more security parameters.

8. The method of claim 1, further comprising:
receiving, on the RAT of the second type, a message requesting the WTRU to perform a random access procedure on the RAT of the first type; and
initiating the random access procedure using resources of the RAT of the first type based on the message received on the RAT of the second type.

9. The method of claim 1, wherein:
the configuring of the primary radio connection includes establishing at least one signaling radio bearer (SRB) of the RRC connection;
the receiving of the configuration information includes, receiving configuration information over the at least one SRB of the RRC connection; and
the receiving of the control information includes receiving the control information over the at least one SRB of the RRC connection that uses the primary radio connection.

10. The method of claim 9, further comprising communicating, by the WTRU over the at least one SRB of the RRC connection via any of: the primary radio connection or the secondary radio connection that are associated with a single RRC state.

11. A multi-radio access technology (multi-RAT) wireless transmitter/receiver unit (WTRU), comprising:
a processor configured to:
configure a primary radio connection of a RAT of a first type associated with a radio resource control (RRC) connection, and
configure a secondary radio connection of a RAT of a second type based on received configuration information of the RAT of the second type, wherein the primary radio connection and the secondary radio connection are associated with the RRC connection; and
a wireless transmit/receive unit configured to:
receive the configuration information to configure the secondary radio connection of the RAT of the second type, and
receive control information related to the RAT of the second type using the primary radio connection,
wherein:
the processor is configured to determine that a radio link failure has occurred on the RAT of the second type, and
the wireless transmit/receive unit is configured to transmit an RRC message using resources of the RAT of the first type based on the determined radio link failure.

12. The multi-RAT WTRU of claim 11, wherein:
the first type of RAT is one of: (1) a wideband code division multiple access (WCDMA) RAT; (2) a high speed packet access (HSPA) RAT; (3) a high speed downlink packet access (HSDPA) RAT; (4) a high speed uplink packet access (HSUPA) RAT; or (5) a long term evolution (LTE) RAT; and
the second type of RAT is different from the first type of RAT.

13. The multi-RAT WTRU of claim 11, wherein:
the processor is configured to configure a primary channel associated with the RAT of the first type and a supplementary channel associated with the RAT of the second type; and
the wireless transmit/receive unit is configured to receive information over the RRC connection associated with the RAT of the first type to control radio resources of the RATs of the first and second types.

14. The multi-RAT WTRU of claim 11, wherein:
the wireless transmit/receive unit is configured to transmit a message based on a RRC protocol of the RAT of the second type only using resources of the RAT of the second type, and
the message corresponds to a RRC reconfiguration of the RAT of the second type.

15. The multi-RAT WTRU of claim 11, wherein the wireless transmit/receive unit is configured to send a notification over the primary radio connection on condition that the radio link failure has occurred on the secondary radio connection of the RAT of the second type.

16. The multi-RAT WTRU of claim 11, wherein:
the processor is configured to establish at least one signaling radio bearer (SRB) of the RRC connection; and
the wireless transmit/receive unit is configured to receive the configuration and the control information over the at least one SRB of the RRC connection that uses the primary radio connection.

17. The multi-RAT WTRU of claim 11, wherein:
the configuration information, received via the RAT of the first type, includes parameters for accessing a network of the second type, and
the parameters include at least one of: a frequency band or a set of one or more security parameters.

18. The multi-RAT WTRU of claim 11, wherein:
the wireless transmit/receive unit is configured to receive, on the RAT of the first type, a message requesting the WTRU to perform a random access procedure on the RAT of the second type; and
the processor is configured to initiate the random access procedure using resources of the RAT of the second type based on the message received on the RAT of the first type.

\* \* \* \* \*